ис010314129B2

United States Patent
Kober et al.

(10) Patent No.: US 10,314,129 B2
(45) Date of Patent: Jun. 4, 2019

(54) TURN-ON PROCEDURE FOR A LOAD CONTROL DEVICE

(71) Applicant: Lutron Electronics Co., Inc., Coopersburg, PA (US)

(72) Inventors: Steven J. Kober, Center Valley, PA (US); Soma Sekhara Rao Konijeti, Bengaluru (IN); Rajesh Krishna Thottumkara, Thillenkery (IN); Keertana Veeranki, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 15/904,130

(22) Filed: Feb. 23, 2018

(65) Prior Publication Data

US 2018/0249543 A1 Aug. 30, 2018

Related U.S. Application Data

(60) Provisional application No. 62/463,159, filed on Feb. 24, 2017, provisional application No. 62/562,008, (Continued)

(51) Int. Cl.
*H05B 37/02* (2006.01)
*H05B 33/08* (2006.01)
(Continued)

(52) U.S. Cl.
CPC .......... *H05B 33/0848* (2013.01); *H02M 1/36* (2013.01); *H05B 33/0815* (2013.01); *H05B 37/0209* (2013.01); *H02M 3/33507* (2013.01)

(58) Field of Classification Search
CPC .. H05B 41/28; H05B 41/295; H05B 41/2827; H05B 41/3925; H05B 33/0815;
(Continued)

(56) References Cited

U.S. PATENT DOCUMENTS 8,111,008 B2 2/2012 Veskovic et al.
8,441,197 B2 5/2013 Taipale et al.
(Continued)

OTHER PUBLICATIONS

U.S. Appl. No. 15/903,989, filed Feb. 23, 2018, DeJonge, et al.

*Primary Examiner* — Minh D A
(74) *Attorney, Agent, or Firm* — Condo Roccia Koptiw LLP

(57) ABSTRACT

A load control device may be configured to turn on lighting loads to obtain a fast turn-on time that may be substantially consistent across lighting loads that have different load voltages. The load control device may comprise a power converter circuit configured to produce a voltage across a capacitor, and a control circuit configured to control the power converter circuit to generate the voltage across the capacitor. The control circuit may determine a learned voltage from the magnitude of the voltage across the capacitor. For example, the control circuit may measure the magnitude of the voltage and store the measured voltage as the learned voltage. The control circuit may determine an operating parameter for the power converter circuit as a function of the learned voltage, and control the power converter circuit according to the operating parameter to charge the capacitor until the magnitude of the voltage exceeds a threshold.

26 Claims, 12 Drawing Sheets

Related U.S. Application Data filed on Sep. 22, 2017, provisional application No. 62/580,671, filed on Nov. 2, 2017.

(51) Int. Cl.
 *H02M 1/36* (2007.01)
 *H02M 3/335* (2006.01)

(58) Field of Classification Search
 CPC ............ H05B 33/0818; H05B 41/2828; H05B 41/3921; H05B 41/3927; H05B 37/029; H05B 37/02; H05B 37/0254; H05B 33/0803; Y02B 20/202; F21Y 2101/02
 See application file for complete search history.

(56) References Cited

U.S. PATENT DOCUMENTS

| | | | |
|---|---|---|---|
| 8,466,628 B2 | 6/2013 | Shearer et al. | |
| 8,492,987 B2 | 7/2013 | Nuhfer et al. | |
| 8,492,988 B2 | 7/2013 | Nuhfer et al. | |
| 8,593,076 B2 | 11/2013 | Veskovic | |
| 9,232,574 B2 | 1/2016 | Veskovic | |
| 9,247,608 B2 | 1/2016 | Chitta et al. | |
| 9,491,823 B2 | 11/2016 | Watanabe et al. | |
| 9,655,177 B2 | 5/2017 | Veskovic | |
| 10,009,968 B2 * | 6/2018 | Chen ................ | H05B 33/0815 |
| 2003/0001522 A1 * | 1/2003 | Newman, Jr. .......... | H05B 41/28 315/291 |
| 2009/0040793 A1 | 2/2009 | Huynh et al. | |
| 2011/0080110 A1 | 4/2011 | Nuhfer et al. | |
| 2013/0063047 A1 | 3/2013 | Veskovic | |
| 2014/0009085 A1 | 1/2014 | Veskovic | |
| 2014/0285109 A1 | 9/2014 | Liao et al. | |
| 2015/0130372 A1 | 5/2015 | Chitta et al. | |
| 2015/0318787 A1 | 11/2015 | Chitta et al. | |
| 2016/0323953 A1 | 11/2016 | DeJonge | |
| 2016/0374164 A1 | 12/2016 | Stevens et al. | |
| 2017/0188430 A1 | 6/2017 | Gredler et al. | |
| 2018/0084616 A1 | 3/2018 | Kober | |

\* cited by examiner

TURN-ON PROCEDURE FOR A LOAD CONTROL DEVICE

CROSS-REFERENCE TO RELATED APPLICATIONS

This application claims the benefit of U.S. Provisional Patent Application No. 62/463,159, filed Feb. 24, 2017, U.S. Provisional Patent Application No. 62/562,008, filed Sep. 22, 2017, and U.S. Provisional Patent Application No. 62/580,671, filed Nov. 2, 2017, the entire disclosures of which are hereby incorporated by reference.

BACKGROUND OF THE INVENTION

Light-emitting diode (LED) light sources (e.g., LED light engines) are replacing conventional incandescent, fluorescent, and halogen lamps as a primary form of lighting devices. LED light sources may comprise a plurality of light-emitting diodes mounted on a single structure and provided in a suitable housing. LED light sources may be more efficient and provide longer operational lives as compared to incandescent, fluorescent, and halogen lamps. An LED driver control device (e.g., an LED driver) may be coupled between a power source, such as an alternating-current (AC) power source or a direct-current (DC) power source, and an LED light source for regulating the power supplied to the LED light source. For example, the LED driver may regulate the voltage provided to the LED light source, the current supplied to the LED light source, or both the current and voltage.

Different control techniques may be employed to drive LED light sources including, for example, a current load control technique and a voltage load control technique. An LED light source driven by the current load control technique may be characterized by a rated current (e.g., approximately 350 milliamps) to which the magnitude (e.g., peak or average magnitude) of the current through the LED light source may be regulated to ensure that the LED light source is illuminated to the appropriate intensity and/or color. An LED light source driven by the voltage load control technique may be characterized by a rated voltage (e.g., approximately 15 volts) to which the voltage across the LED light source may be regulated to ensure proper operation of the LED light source. If an LED light source rated for the voltage load control technique includes multiple parallel strings of LEDs, a current balance regulation element may be used to ensure that the parallel strings have the same impedance so that the same current is drawn in each of the parallel strings.

The light output of an LED light source may be dimmed. Methods for dimming an LED light source may include, for example, a pulse-width modulation (PWM) technique and a constant current reduction (CCR) technique. In pulse-width modulation dimming, a pulsed signal with a varying duty cycle may be supplied to the LED light source. For example, if the LED light source is being controlled using a current load control technique, the peak current supplied to the LED light source may be kept constant during an on-time of the duty cycle of the pulsed signal. The duty cycle of the pulsed signal may be varied, however, to vary the average current supplied to the LED light source, thereby changing the intensity of the light output of the LED light source. As another example, if the LED light source is being controlled using a voltage load control technique, the voltage supplied to the LED light source may be kept constant during the on-time of the duty cycle of the pulsed signal. The duty cycle of the load voltage may be varied, however, to adjust the intensity of the light output. Constant current reduction dimming may be used if an LED light source is being controlled using the current load control technique. In constant current reduction dimming, current may be continuously provided to the LED light source. The DC magnitude of the current provided to the LED light source, however, may be varied to adjust the intensity of the light output.

Examples of LED drivers are described in U.S. Pat. No. 8,492,987, issued Jul. 23, 2013, entitled LOAD CONTROL DEVICE FOR A LIGHT-EMITTING DIODE LIGHT SOURCE; U.S. Pat. No. 9,655,177, issued May 16, 2017, entitled FORWARD CONVERTER HAVING A PRIMARY-SIDE CURRENT SENSE CIRCUIT; and U.S. Pat. No. 9,247,608, issued Jan. 26, 2016, entitled LOAD CONTROL DEVICE FOR A LIGHT-EMITTING DIODE LIGHT SOURCE; the entire disclosures of which are hereby incorporated by reference.

SUMMARY OF THE INVENTION

As described herein, a load control device for controlling the intensity of a lighting load may be configured to turn on the lighting load to obtain a fast turn-on time that may be substantially consistent across different lighting loads that have different load voltages. The load control device may comprise a power converter circuit that may be configured to receive a first voltage and to produce a second voltage across a capacitor, and a control circuit that is operatively coupled to the power converter circuit for controlling the power converter circuit to generate the second voltage across the capacitor. The control circuit may be configured to determine a learned voltage (e.g., a learned capacitor voltage and/or a learned load voltage) from the magnitude of the second voltage of the capacitor. For example, the control circuit may measure the magnitude of the second voltage of the capacitor and/or store the measured voltage as the learned voltage. The control circuit may determine an operating parameter for the power converter circuit as a function of the learned voltage. The control circuit may be configured to control the power converter circuit according to the operating parameter while the capacitor is charging until the magnitude of the second voltage reaches a threshold.

In an example, the load control device may also include a load regulation circuit configured to receive the second voltage (e.g., a bus voltage) and to control the magnitude of a load current conducted through the lighting load. The control circuit may be operatively coupled to the load regulation circuit for controlling the magnitude of the load current to control the intensity of the lighting load. The control circuit may determine an on-time for controlling a semiconductor switch of the power converter circuit as a function of the learned voltage, and control the semiconductor switch conductive using the pre-load on-time to charge the capacitor until the magnitude of the second voltage reaches the threshold.

In another example, the power converter circuit may operate as a load regulation circuit to control the magnitude of the load current conducted through the lighting load. The control circuit may be operatively coupled to the power converter circuit for controlling the magnitude of the load current to control the intensity of the lighting load. The control circuit may set a magnitude of a target-current control signal for controlling the power converter circuit based on the learned voltage to charge the capacitor until the magnitude of the second voltage reaches the threshold.

DETAILED DESCRIPTION OF THE INVENTION

Figure 1:
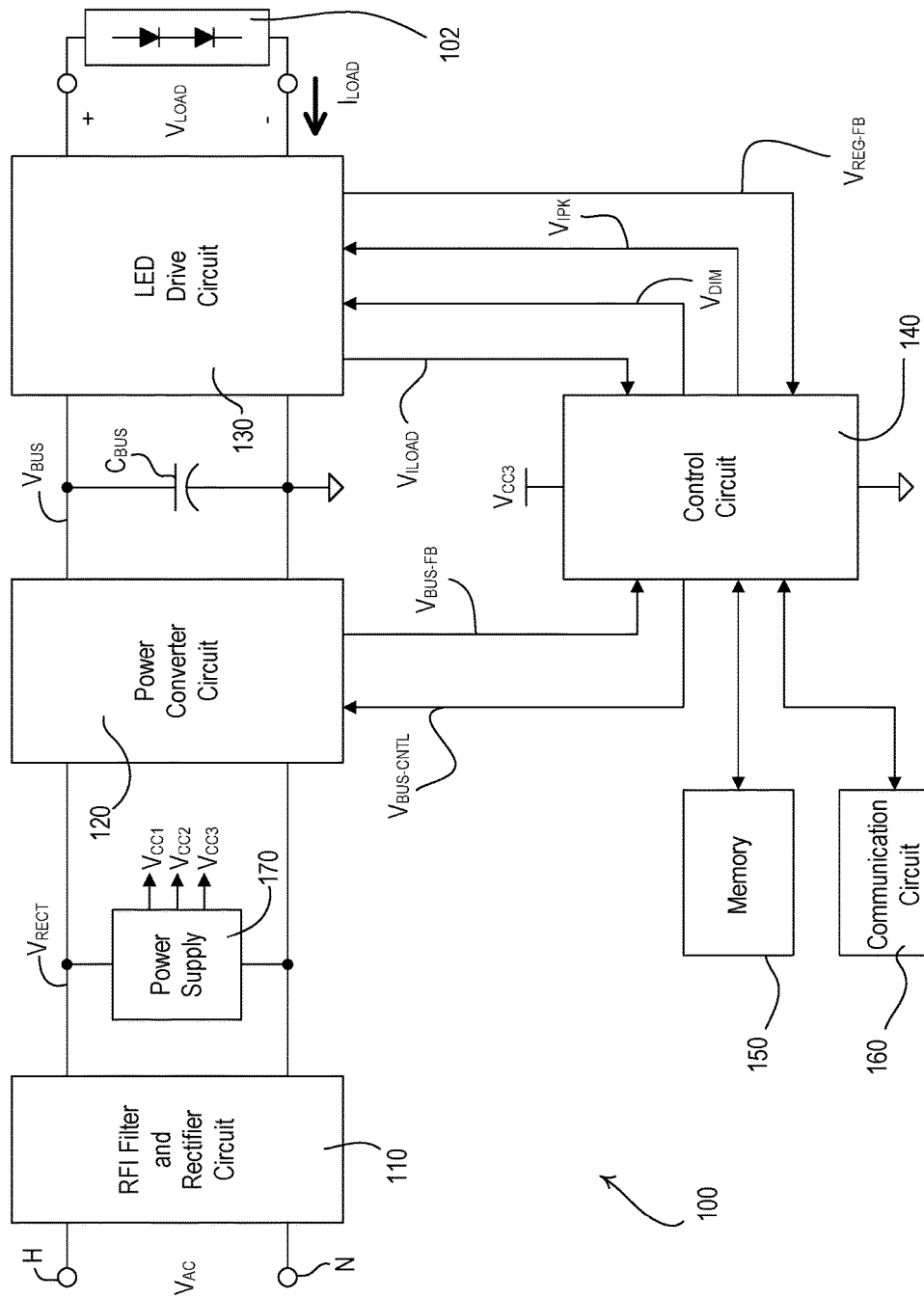
FIG. 1 is a simplified block diagram of an example light-emitting diode (LED) driver for controlling the intensity of an LED light source.

FIG. 1 is a simplified block diagram of a light-emitting diode (LED) driver 100 for controlling the intensity of an LED light source 102 (e.g., an LED light engine). The LED light source 102 is shown as a plurality of LEDs connected in series but may comprise a single LED or a plurality of LEDs connected in parallel or a suitable combination thereof, depending on the particular lighting system. In addition, the LED light source 102 may alternatively comprise one or more organic light-emitting diodes (OLEDs). The LED driver 100 may be adapted to work with a plurality of different LED light sources, which may be rated to operate using different load control techniques, different dimming techniques, and different magnitudes of load current and voltage.

The LED driver 100 may comprise a hot terminal H and a neutral terminal N for receiving an alternating-current (AC) voltage $V_{AC}$ from an AC power source (not shown).

The LED driver 100 may comprise a radio-frequency (RFI) filter and rectifier circuit 110, which may receive the AC voltage $V_{AC}$. The RFI filter and rectifier circuit 110 may operate to minimize the noise provided on the AC power source and to generate a rectified voltage $V_{RECT}$. The LED driver 100 may comprise a power converter circuit 120, e.g., a buck-boost flyback converter, which may receive the rectified voltage $V_{RECT}$ and generate a variable direct-current (DC) bus voltage $V_{BUS}$ across a capacitor (e.g., a storage capacitor, such as a bus capacitor $C_{BUS}$). The power converter circuit 120 may alternatively comprise any suitable power converter circuit for generating an appropriate bus voltage, such as, for example, a boost converter, a buck converter, a single-ended primary-inductance converter (SEPIC), a Ćuk converter, or other suitable power converter circuit. The power converter circuit 120 may also provide electrical isolation between the AC power source and the LED light source 102, and/or operate as a power factor correction (PFC) circuit to adjust the power factor of the LED driver 100 towards a power factor of one.

The LED driver 100 may comprise a load regulation circuit, e.g., an LED drive circuit 130, which may receive the bus voltage $V_{BUS}$ and control the amount of power delivered to the LED light source 102 so as to control the intensity of the LED light source. The LED drive circuit 130 may comprise a controllable-impedance circuit, such as a linear regulator, as will be described in greater detail below. To control the amount of power delivered to the LED light source 102, the LED drive circuit 130 may be configured to control the magnitude of a load current $I_{LOAD}$ through the LED light source 102 and/or the magnitude of a load voltage $V_{LOAD}$ across the LED light source.

The LED driver 100 may include a control circuit 140 for controlling the operation of the power converter circuit 120 and/or the LED drive circuit 130. The control circuit 140 may comprise, for example, a controller or any other suitable processing device, such as, for example, a microcontroller, a programmable logic device (PLD), a microprocessor, an application specific integrated circuit (ASIC), or a field-programmable gate array (FPGA). The control circuit 140 may be configured to control the LED drive circuit 130 to turn the LED light source 102 on and off and to adjust (e.g., dim) a present intensity $L_{PRES}$ of the LED light source 102 towards a target intensity $L_{TRGT}$, which may range across a dimming range of the LED light source, e.g., between a low-end intensity $L_{LE}$ (e.g., approximately 0.1-10%) and a high-end intensity $L_{HE}$ (e.g., approximately 100%). The control circuit 140 may be configured to control the LED drive circuit 130 to control the load voltage $V_{LOAD}$ across the LED light source 102 and/or the load current $I_{LOAD}$ through the LED light source to control the amount of power delivered to the LED light source (e.g., depending upon a mode of operation of the LED driver as will be described in greater detail below). In an example, when power is first applied to the LED driver 100, the control circuit 140 may be configured to execute a startup routine before executing a turn-on routine (e.g., a turn-on procedure) to illuminate the LED light source 102.

The control circuit 140 may be configured to control the magnitude of the load current $I_{LOAD}$ through the LED light source 102 or the load voltage $V_{LOAD}$ across the LED light source using two different modes of operation: a current load control mode (e.g., for using the current load control technique) and a voltage load control mode (e.g., for using the voltage load control technique). The control circuit 140 may be configured to adjust the magnitude to which the LED drive circuit 130 controls the load current $I_{LOAD}$ through the LED light source 102 in the current load control mode, or the magnitude to which the LED drive circuit 130 controls the load voltage $V_{LOAD}$ across the LED light source in the voltage load control mode. When operating in the current load control mode, the control circuit 140 may be configured to control the intensity of the LED light source 102 using two different dimming modes: a PWM dimming mode (e.g., for using the PWM dimming technique) and a CCR dimming mode (e.g., for using the CCR dimming technique). When operating in the voltage load control mode, the LED driver 100 may be configured to adjust the amount of power delivered to the LED light source 102 using the PWM dimming technique.

The control circuit 140 may be coupled to a memory 150 for storing operational characteristics of the LED driver 100 (e.g., the target intensity $L_{TRGT}$, the low-end intensity $L_{LE}$, the high-end intensity $L_{HE}$, etc.). The memory 150 may be implemented as an external integrated circuit (IC) or as an internal circuit of the control circuit 140. The LED driver 100 may also comprise a communication circuit 160, which may be coupled to, for example, a wired communication link or a wireless communication link, such as a radio-frequency (RF) communication link or an infrared (IR) communication link. The control circuit 140 may be configured to determine the target intensity $L_{TRGT}$ of the LED light source 102 or the operational characteristics stored in the memory 150 in response to digital messages received via the communication circuit 160. The control circuit 140 may be configured to execute the turn-on routine, e.g., in response to receiving a command to turn on the LED light source 102.

The LED driver 100 may further comprise a power supply 170, which may receive the rectified voltage $V_{RECT}$ and generate a plurality of direct-current (DC) supply voltages for powering the circuitry of the LED driver. Specifically, the power supply 170 may generate a first non-isolated supply voltage $V_{CC1}$ (e.g., approximately 14 volts) for powering the control circuitry of the power converter circuit 120, a second isolated supply voltage $V_{CC2}$ (e.g., approximately 9 volts) for powering the control circuitry of the LED drive circuit 130, and a third non-isolated supply voltage $V_{CC3}$ (e.g., approximately 5 volts) for powering the control circuit 140.

As previously mentioned, the control circuit 140 may manage the operation of the power converter circuit 120 and/or the LED drive circuit 130 to control the intensity of the LED light source 102. The control circuit 140 may receive from the power converter circuit 120 a bus voltage feedback signal $V_{BUS-FB}$, which may be representative of the magnitude of the bus voltage $V_{BUS}$. The control circuit 140 may provide a bus voltage control signal $V_{BUS-CNTL}$ to the power converter circuit 120 for controlling the magnitude of the bus voltage $V_{BUS}$ towards a target bus voltage $V_{BUS-TRGT}$ (e.g., from approximately 8 volts to 60 volts). When operating in the current load control mode, the LED drive circuit 130 may control a peak magnitude $I_{PK}$ of the load current $I_{LOAD}$ conducted through the LED light source 102 between a minimum load current $I_{LOAD-MIN}$ and a maximum load current $I_{LOAD-MAX}$ in response to a peak current control signal $V_{IPK}$ provided by the control circuit 140.

The control circuit 140 may receive a load current feedback signal $V_{ILOAD}$, which may be representative of an average magnitude $I_{AVE}$ of the load current $I_{LOAD}$ flowing through the LED light source 102. The control circuit 140 may also receive a regulator voltage feedback signal $V_{REG-FB}$ that may be representative of the magnitude of a regulator voltage $V_{REG}$ (e.g., a controllable-impedance voltage) across the linear regulator of the LED drive circuit 130 as will be described in greater detail below. The difference between the magnitudes of the bus voltage $V_{BUS}$ and the regulator feedback voltage $V_{REG-FB}$ may be representative of the magnitude of the load voltage $V_{LOAD}$ across the LED light source 102.

The control circuit 140 may be configured to control the LED drive circuit 130 to control the amount of power delivered to the LED light source 102 using the two different modes of operation (e.g., the current load control mode and the voltage load control mode). During the current load control mode, the LED drive circuit 130 may regulate the peak magnitude $I_{PK}$ of the load current $I_{LOAD}$ through the LED light source 102 in response to the load current feedback signal $V_{ILOAD}$ (e.g., using closed loop control). The target load current $I_{TRGT}$ may be stored in the memory 150 and may be programmed to be any specific magnitude depending upon the LED light source 102.

To control the intensity of the LED light source 102 during the current load control mode, the control circuit 140 may control the LED drive circuit 130 to adjust the amount of power delivered to the LED light source 102 using the PWM dimming technique and/or the CCR dimming technique. Using the PWM dimming technique, the control circuit 140 may control the peak magnitude $I_{PK}$ of the load current $I_{LOAD}$ through the LED light source 102 to the target load current $I_{TRGT}$ and pulse-width modulate the load current $I_{LOAD}$ to dim the LED light source 102 and achieve the target load current $I_{TRGT}$. Specifically, the LED drive circuit 130 may control a duty cycle $DC_{ILOAD}$ of the load current $I_{LOAD}$ in response to a duty cycle $DC_{DIM}$ of a dimming control signal $V_{DIM}$ provided by the control circuit 140. The intensity of the LED light source 102 may be dependent upon the duty cycle $DC_{ILOAD}$ of the pulse-width modulated load current $I_{LOAD}$. Using the CCR dimming technique, the control circuit 140 may not pulse-width modulate the load current $I_{LOAD}$, but instead may adjust the magnitude of the target load current $I_{TRGT}$ so as to adjust the average magnitude $I_{AVE}$ of the load current $I_{LOAD}$ through the LED light source 102 (which may be equal to the peak magnitude $I_{PK}$ of the load current $I_{LOAD}$ in the CCR dimming mode).

During the voltage load control mode, the LED drive circuit 130 may regulate the magnitude (e.g., the DC voltage) of the load voltage $V_{LOAD}$ across the LED light source 102 to a target load voltage $V_{TRGT}$. The target load voltage $V_{TRGT}$ may be stored in the memory 150 and may be programmed to be any specific magnitude depending upon the LED light source 102. The control circuit 140 may be configured to dim the LED light source 102 using only the PWM dimming technique during the voltage load control mode. Specifically, the control circuit 140 may adjust a duty cycle $DC_{VLOAD}$ of the load voltage $V_{LOAD}$ to dim the LED light source 102. An example of a configuration procedure for the LED driver 100 is described in greater detail in U.S. Pat. No. 8,492,988, issued Jul. 23, 2013, entitled CONFIGURABLE LOAD CONTROL DEVICE FOR LIGHT-EMITTING DIODE LIGHT SOURCES, the entire disclosure of which is hereby incorporated by reference.

The control circuit 140 may be configured to determine or learn (e.g., measure or receive an indication of) one or more operational characteristics of the LED light source 102 (e.g., learned load characteristics). For example, when the control circuit 140 is operating in the current control mode, the control circuit may be configured to determine the magnitude of a voltage representative of the magnitude of the load voltage $V_{LOAD}$. During the current control mode, the magnitude of the load voltage $V_{LOAD}$ generated across the LED light source 102 may be dependent upon the magnitude of the load current $I_{LOAD}$ (e.g., the target load current $I_{TRGT}$ to which the control circuit 140 is regulating the load current $I_{LOAD}$) as well as the internal circuitry of the LED light source. The control circuit 140 may be configured to determine (e.g., measure) the magnitude of the voltage that is representative of the magnitude of the load voltage $V_{LOAD}$ (e.g., when the target intensity $L_{TRGT}$ is at the high-end intensity $L_{HE}$) and/or to store the measurement in the memory 150 as a learned load voltage $V_{LEARNED}$.

Since the control circuit 140 may operate to minimize the regulator voltage $V_{REG}$ across the linear regulator of the LED drive circuit 130 (e.g., to approximately 0.4-0.6 V), the magnitude of the bus voltage $V_{BUS}$ may be approximately equal to the load voltage $V_{LOAD}$ and thus representative of the magnitude of the load voltage $V_{LOAD}$. The control circuit 140 may be configured to determine (e.g., measure) the magnitude of the bus voltage $V_{BUS}$ stored in the bus capacitor $C_{BUS}$ using the bus voltage feedback signal $V_{BUS-FB}$ from the power converter circuit 120 and/or store the measurement in the memory 150 as the learned load voltage $V_{LEARNED}$ (e.g., a learned capacitor voltage). The control circuit 140 may be configured to calculate the magnitude of the load voltage $V_{LOAD}$ by subtracting the magnitude of a regulator voltage $V_{REG}$ (e.g., as determined from the regulator voltage feedback signal $V_{REG-FB}$) from the magnitude of the bus voltage $V_{BUS}$ and use the calculated value as the learned load voltage $V_{LEARNED}$. The control circuit 140 may include a load voltage measurement circuit (not shown) coupled across the LED light source 102 for directly measuring the magnitude of the load voltage $V_{LOAD}$, which may be stored as the learned load voltage $V_{LEARNED}$. Additionally or alternatively, the control circuit 140 may be configured to determine (e.g., measure) the magnitude of a voltage that is representative of the magnitude of the load voltage $V_{LOAD}$ at the low-end intensity $L_{LE}$ and/or store the measurement in the memory 150 as the learned load voltage $V_{LEARNED}$.

The control circuit 140 may be configured to control the power converter circuit 120 and/or the LED drive circuit 130 using the learned load voltage $V_{LEARNED}$. For example, the control circuit 140 may be configured to control the power converter circuit 120 in response to the learned load voltage $V_{LEARNED}$ when turning on the LED light source 102. The control circuit 140 may be configured to control the rate at which the bus capacitor $C_{BUS}$ charges in response to the learn load voltage $V_{LEARNED}$ to ensure that the bus voltage $V_{BUS}$ quickly increases to the appropriate level and the LED light source 102 is illuminated as soon as possible. For example, in response to receiving a command to turn on the LED light source 102 and/or in response to power being applied to the LED driver 100 to turn on the LED light source, the control circuit 140 may control the power converter circuit 120 using open loop control in response to the magnitude of the learned load voltage $V_{LEARNED}$ until the magnitude of the bus voltage $V_{BUS}$ reaches or exceeds a charging threshold $V_{TH-CH}$. The charging threshold $V_{TH-CH}$ may be, for example, a function of the learned load voltage $V_{LEARNED}$. For example, the control circuit 140 may be configured to determine an operating parameter (e.g., a pre-load parameter) as a function of the learned load voltage $V_{LEARNED}$ and use the operating parameter to control the power converter circuit 120 using open loop control (e.g., as will be described in greater detail below). In addition, the charging threshold $V_{TH-CH}$ may be a fixed threshold (e.g., a predetermined threshold). After the magnitude of the bus voltage $V_{BUS}$ reaches or exceeds a bus voltage threshold $V_{TH-BUS}$, the control circuit 140 may then begin to control the power converter circuit 120 using closed loop control in response to the magnitude of the bus voltage feedback signal $V_{BUS-FB}$ to regulate the magnitude of the bus voltage $V_{BUS}$ towards the target bus voltage $V_{BUS-TRGT}$.

Figure 2:
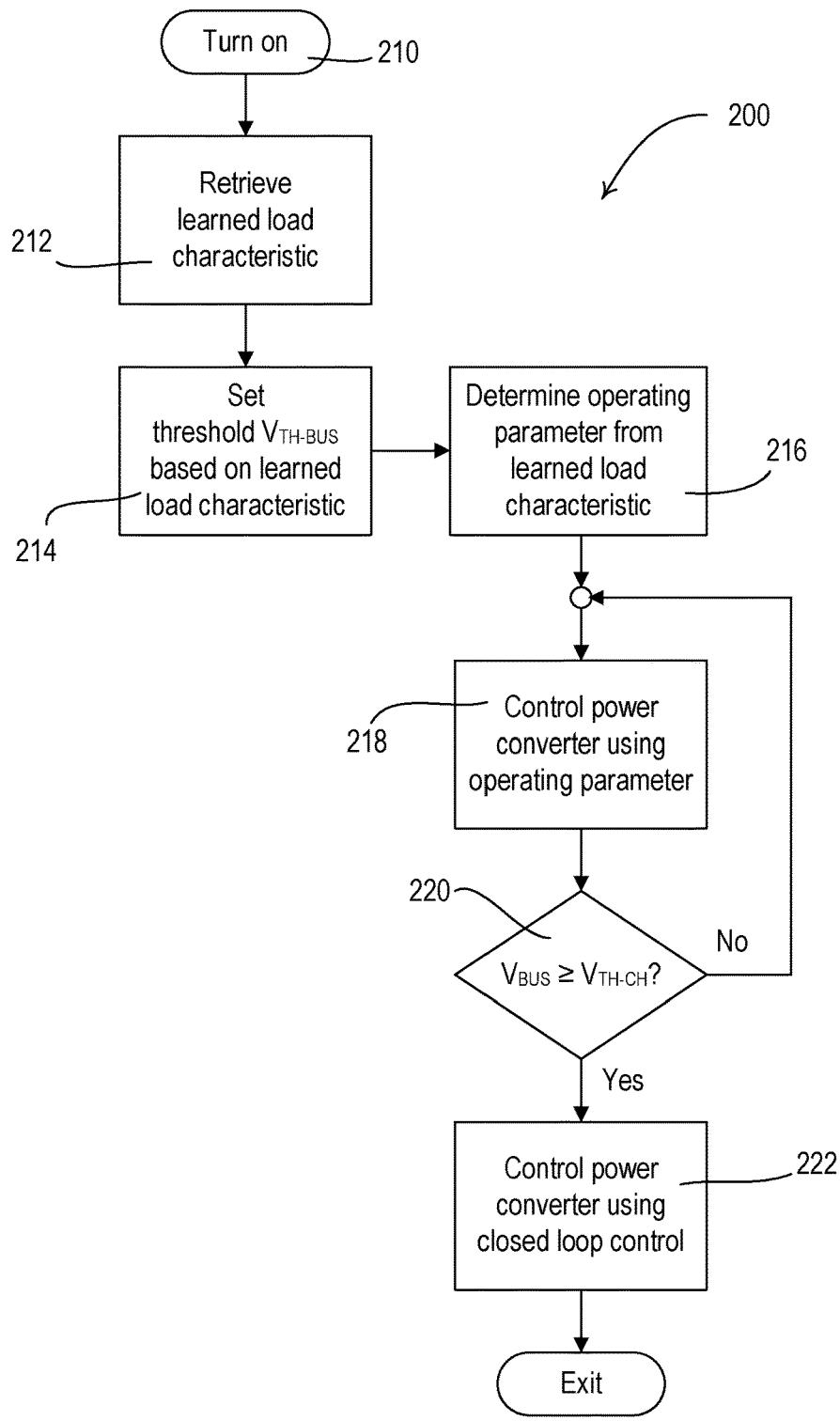
FIG. 2 is a simplified flowchart of an example turn-on procedure for controlling a power converter circuit of an LED driver.

FIG. 2 is a simplified flowchart of an example turn-on procedure 200 for controlling a power converter circuit of an LED driver (e.g., the power converter circuit 120 of the LED driver 100). For example, the turn-on procedure 200 may be executed by a control circuit (e.g., the control circuit 140) at step 210 in response to receiving a command to turn on the LED light source 102 and/or in response to power being applied to the LED driver to turn on the LED light source. The control circuit may retrieve a learned load characteristic (e.g., the learned load voltage $V_{LEARNED}$) from the memory 150 at step 212 and may determine the value of the charging threshold $V_{TH-CH}$ as a function of the learned load voltage $V_{LEARNED}$ at step 214. The control circuit may determine an operating parameter (e.g., a pre-load on-time) for the power converter circuit as a function of the learned load voltage $V_{LEARNED}$ at step 216 and control the power converter circuit using the operating parameter at step 218. While the magnitude of a capacitor voltage (e.g., the bus voltage $V_{BUS}$) is less than the charging threshold $V_{TH-CH}$ at step 220, the control circuit may continue to control the power converter circuit using the operating parameter at step 218. When the magnitude of the capacitor voltage is greater than or equal to the charging threshold $V_{TH-CH}$ at step 220, the control circuit may begin to control the power converter circuit using closed loop control at step 222 to regulate the magnitude of the capacitor voltage towards a target capacitor voltage (e.g., the target bus voltage $V_{BUS-TRGT}$), before the turn-on procedure 200 exits.

Figure 3:
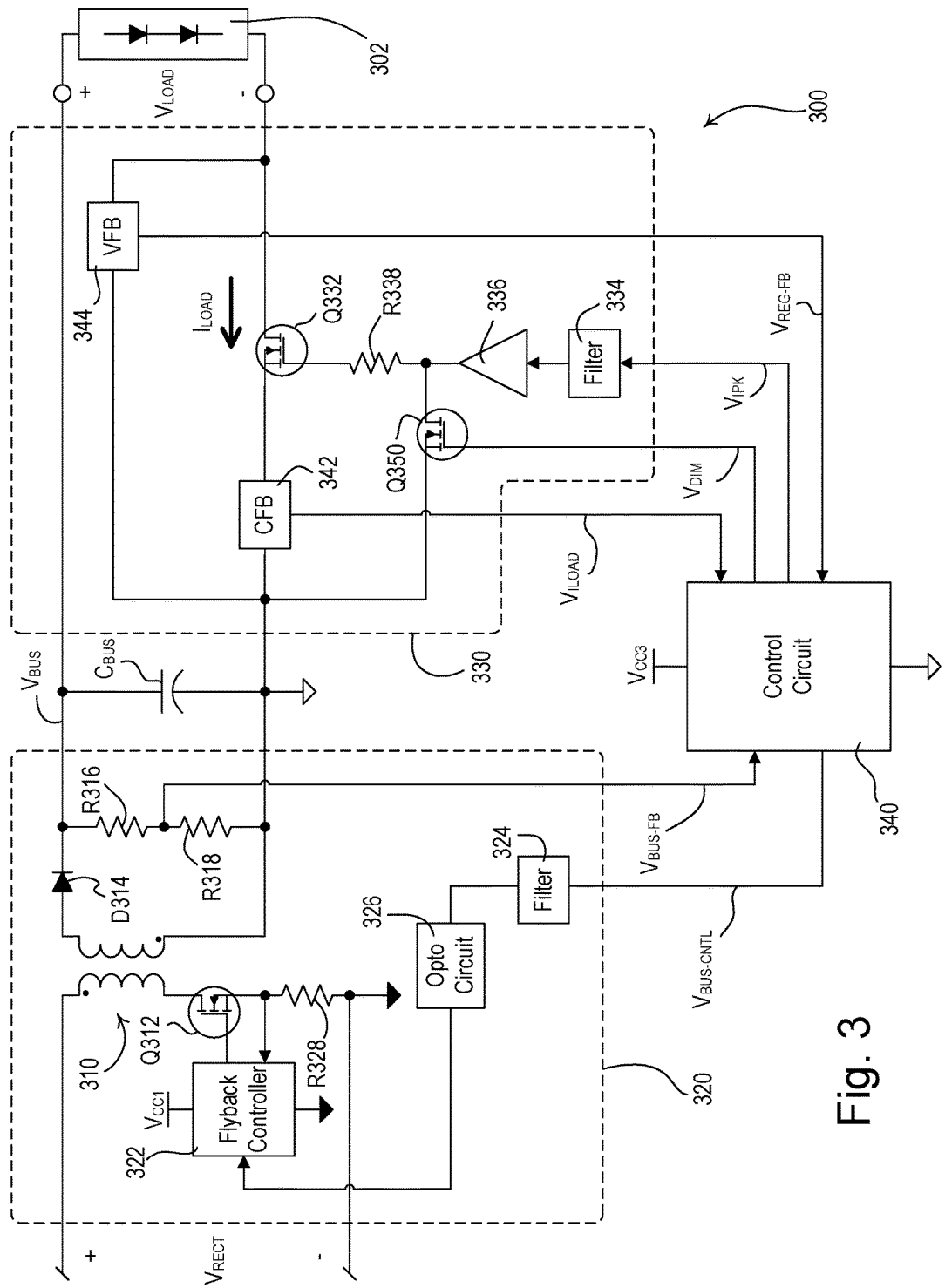
FIG. 3 is a simplified schematic diagram of an example LED driver showing a power converter circuit and an LED drive circuit.

FIG. 3 is a simplified schematic diagram of a load control device, e.g., an LED driver 300 (such as the LED driver 100 of FIG. 1) for controlling the intensity of an LED light source 302. The LED driver 300 may comprise a flyback converter circuit 320 (e.g., the power converter circuit 120), an LED drive circuit 330 (e.g., the LED drive circuit 130), and a control circuit 340 (e.g., the control circuit 140). The flyback converter circuit 320 may comprise a flyback transformer 310 having a primary winding coupled in series with a flyback switching transistor, e.g., a field-effect transistor (FET) Q312, or other suitable semiconductor switch. The secondary winding of the flyback transformer 310 may be coupled to a bus capacitor $C_{BUS}$ via a diode D314. The power converter circuit 320 may comprise a voltage divider comprising two resistors R316, R318 coupled across the bus capacitor $C_{BUS}$ for generating a bus voltage feedback signal $V_{BUS-FB}$.

The control circuit 340 may generate a bus voltage control signal $V_{BUS-CNTL}$ for controlling a flyback controller 322 of the flyback converter circuit 320. The flyback controller 322 may receive the bus voltage control signal $V_{BUS-CNTL}$ from the control circuit 140 via a filter circuit 324 (e.g., a resistor-capacitor filter) and an optocoupler circuit 326, which may provide electrical isolation between the power converter circuit 320 and the control circuit 340. The flyback controller 322 may also receive a control signal representative of the current through the FET Q312 from a feedback resistor R328, which may be coupled in series with the FET. The flyback controller 322 may render the FET Q312 conductive and non-conductive to selectively conduct current through the flyback transformer 310 to thus generate the bus voltage $V_{BUS}$. For example, the flyback controller 322 may be configured to adjust an on-time $t_{ON}$ of the FET Q312 (e.g., the time that the FET Q312 conductive during each operating cycle of the power converter circuit 320) in response to the bus voltage control signal $V_{BUS-CNTL}$ to control the magnitude of the bus voltage $V_{BUS}$.

The LED drive circuit 330 may comprise a linear regulator (e.g., a controllable-impedance circuit) including a power semiconductor switch, e.g., a regulation field-effect transistor (FET) Q332, coupled in series with the LED light source 302 for conducting a load current $I_{LOAD}$ through the LED light source. The control circuit 340 may generate a peak current control signal $V_{IPK}$ that may be coupled to the gate of the regulation FET Q332 through a filter circuit 334, an amplifier circuit 336, and a gate resistor R338. The control circuit 340 may be configured to control a duty cycle $DC_{IPK}$ of the peak current control signal $V_{IPK}$ to control a peak magnitude $I_{PK}$ of the load current $I_{LOAD}$ conducted through the LED light source 302 to a target load current $I_{TRGT}$.

The LED drive circuit 330 may comprise a load current feedback circuit 342 coupled in series with the regulation FET Q332 and a regulator voltage feedback circuit 344 coupled in parallel with the regulation FET Q332. The load current feedback circuit 342 may generate a load current feedback signal $V_{ILOAD}$, which may be provided to the control circuit 340 and may be representative of an average magnitude $I_{AVE}$ of the load current $I_{LOAD}$. The regulator voltage feedback circuit 344 may generate the regulator voltage feedback signal $V_{REG-FB}$, which may also be provided to the control circuit 340 and may be representative of the regulator voltage $V_{REG}$ generated across the series combination of the regulation FET Q332 and the load current feedback circuit 342. Other examples of feedback circuits for the LED drive circuit 330 are described in greater detail in U.S. Pat. No. 8,466,628, issued Jun. 18, 2013, entitled CLOSED-LOOP LOAD CONTROL CIRCUIT HAVING A WIDE OUTPUT RANGE, the entire disclosure of which is hereby incorporated by reference.

When operating in the current load control mode, the control circuit 340 may control the regulation FET Q332 to operate in the linear region, such that the peak magnitude $I_{PK}$ of the load current $I_{LOAD}$ may be dependent upon the DC magnitude of the gate voltage at the gate of the regulation transistor Q332. In other words, the regulation FET Q332 may provide a controllable-impedance in series with the LED light source 302. If the magnitude of the regulator voltage $V_{REG}$ drops too low, the regulation FET Q332 may be driven into the saturation region, such that the regulation FET Q332 may become fully conductive and the control circuit 340 may no longer be able to control the peak magnitude $I_{PK}$ of the load current $I_{LOAD}$. Therefore, the control circuit 340 may adjust the magnitude of the bus voltage $V_{BUS}$ to prevent the magnitude of the regulator voltage $V_{REG}$ from dropping below a minimum regulator voltage threshold $V_{REG-MIN}$ (e.g., approximately 0.4 volts). In addition, the control circuit 340 may also be configured to adjust the magnitude of the bus voltage $V_{BUS}$ to control the magnitude of the regulator voltage $V_{REG}$ to be less than a maximum regulator voltage threshold $V_{REG-MAX}$ (e.g., approximately 0.6 volts) to prevent the power dissipated in regulation FET Q332 from becoming too large, thus increasing the total efficiency of the LED driver 300.

When operating in the voltage load control mode, the control circuit 340 may be configured to drive the regulation FET Q332 into the saturation region, such that the magnitude of the load voltage $V_{LOAD}$ may be approximately equal to the magnitude of the bus voltage $V_{BUS}$ (minus the small voltage drops due to the on-state drain-source resistance $R_{DS-ON}$ of the FET regulation Q332 and the resistance of the feedback resistor R344).

The LED drive circuit 330 may also comprise a dimming FET Q350, which may be coupled between the gate of the regulation FET Q332 and circuit common. The dimming control signal $V_{DIM}$ from the control circuit 340 may be provided to the gate of the dimming FET Q350. When the dimming FET Q350 is rendered conductive, the regulation FET Q332 may be rendered non-conductive, and when the dimming FET Q250 is rendered non-conductive, the regulation FET Q332 may be rendered conductive. While using the PWM dimming technique during the current load control mode, the control circuit 340 may adjust the duty cycle $DC_{DIM}$ of the dimming control signal $V_{DIM}$ to thus control when the regulation FET conducts the load current $I_{LOAD}$ and thus the intensity of the LED light source 302. For example, the control circuit 340 may generate the dimming control signal $V_{DIM}$ using a constant PWM frequency $f_{DIM}$ (e.g., approximately 500 Hz).

When using the PWM dimming technique in the current load control mode, the control circuit 340 may be configured to control the peak magnitude $I_{PK}$ of the load current $I_{LOAD}$ in response to the load current feedback signal $V_{ILOAD}$ to maintain the average magnitude $I_{AVE}$ of the load current $I_{LOAD}$ constant (e.g., at the target lamp current $I_{TRGT}$). When using the CCR dimming technique during the current load control mode, the control circuit 340 may maintain the duty cycle $DC_{DIM}$ of the dimming control signal $V_{DIM}$ at a high-end dimming duty cycle $DC_{HE}$ (e.g., approximately 0%, such that the FET Q332 may always be conductive) and may adjust the target load current $I_{TRGT}$ (via the duty cycle $DC_{IPK}$ of the peak current control signal $V_{IPK}$) to control the intensity of the LED light source 302.

When operating in the current load control mode, the control circuit 340 may be configured to determine or learn (e.g., measure or receive an indication of) a voltage that is representative of the magnitude of the load voltage $V_{LOAD}$ generated across the LED light source 302 and/or store the learned magnitude in a memory (e.g., the memory 150) as a learned load voltage $V_{LEARNED}$. For example, when the control circuit is controlling the intensity of the LED light source 302 to the high-end intensity $L_{HE}$, the control circuit 340 may determine (e.g., measure) the magnitude of the bus voltage $V_{BUS}$ using the bus voltage feedback signal $V_{BUS-FB}$ from the flyback converter circuit 320 and/or store the measurement in the memory as the learned load voltage $V_{LEARNED}$. The control circuit 340 may be configured to determine (e.g., measure) the magnitude of the bus voltage $V_{BUS}$, for example, during the startup routine (e.g., when power is first applied to the LED driver 300) and/or after the startup routine (e.g., when the magnitude of the bus voltage $V_{BUS}$ is at a steady state condition).

The control circuit 340 may control the flyback converter circuit 320 in response to the learned load voltage $V_{LEARNED}$ when turning on the LED light source 302 to control the rate at which the bus capacitor $C_{BUS}$ charges to ensure that the LED light source 302 is illuminated quickly after receiving a command to turn on the LED light source 302 and/or after power is applied to the LED driver 300 to turn on the LED light source. When a command to turn on the LED light source 302 has been received and/or power has been applied to the LED driver 300 to turn on the LED light source, the control circuit 340 may be configured to control the flyback converter circuit 320 using open loop control in response to the magnitude of the learned load voltage $V_{LEARNED}$ until the magnitude of the bus voltage $V_{BUS}$ reaches or exceeds a bus voltage threshold $V_{TH-BUS}$ (e.g., the charging threshold $V_{TH-CH}$). The control circuit 340 may be configured to retrieve the learned load voltage $V_{LEARNED}$ from the memory and may determine the value of the bus voltage threshold $V_{TH-BUS}$ as a function of the learned load voltage $V_{LEARNED}$ (e.g., $V_{TH-BUS}=\eta \cdot V_{LEARNED}$), where $\eta$ is a constant that may be, for example, approximately 0.85.

Figure 4:
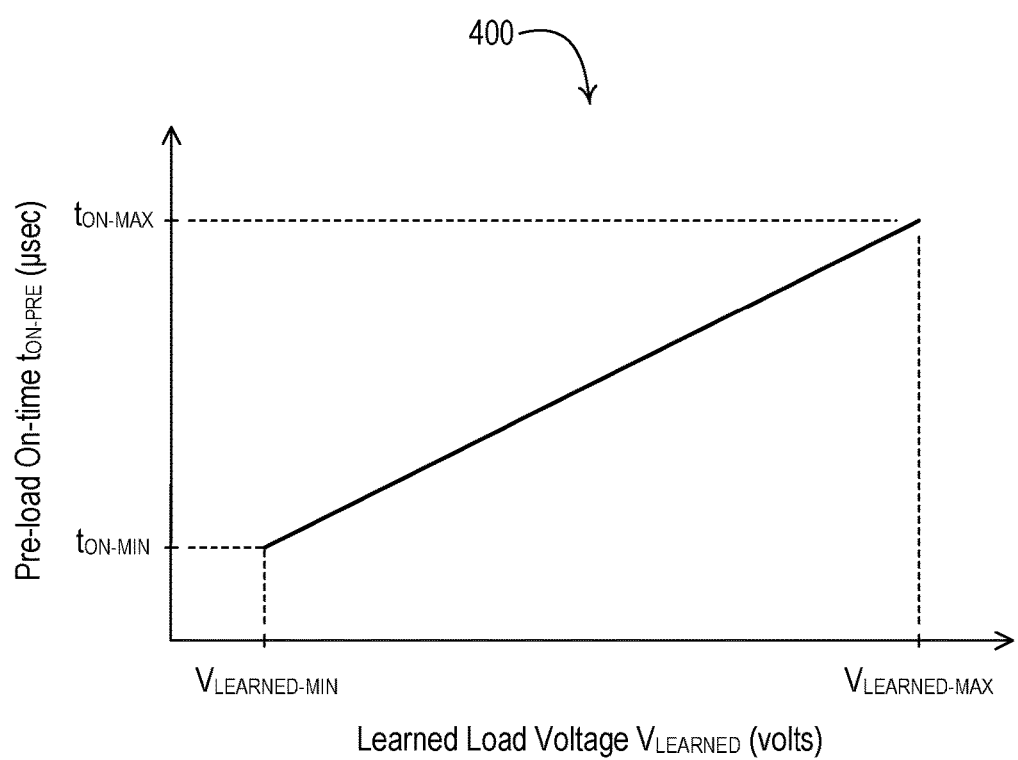
FIG. 4 is a plot showing an example relationship between a learned load voltage and an on-time for controlling a field-effect transistor of the power converter circuit of FIG. 3.

The control circuit 340 may also be configured to determine an operating parameter for the flyback converter circuit 320 as a function of the learned load voltage $V_{LEARNED}$. For example, the operating parameter for the power converter circuit 320 may be the on-time $t_{ON}$ with which to control the FET Q312 while the bus capacitor $C_{BUS}$ is charging, which may be referred to a "pre-load" on-time $t_{ON-PRE}$. FIG. 4 is a plot showing an example relationship 400 between the learned load voltage $V_{LEARNED}$ and the pre-load on-time $t_{ON-PRE}$ for the FET Q312. As shown in FIG. 4, the relationship 400 may be, for example, a linear relationship. The relationship 400 may be stored in the memory, e.g., as an equation or as a table. The relationship 400 may range from a minimum pre-load on-time $t_{ON-MIN}$ (e.g., approximately 159.6 μsec) at a minimum learned load voltage $V_{LEARNED-MIN}$ (e.g., approximately 15 volts) to a maximum pre-load on-time $t_{ON-MAX}$ (e.g., approximately 169.9 μsec) at a maximum learned load voltage $V_{LEARNED-MAX}$ (e.g., approximately 38 volts). The values for the pre-load on-time $t_{ON-PRE}$ of the relationship 400 may be chosen such that a turn-on delay time period for LED driver 300 may be approximately the same for different LED light sources that have different resulting load voltages.

The control circuit 340 may be configured to control the on-time $t_{ON}$ for the FET Q312 to the pre-load on-time $t_{ON-PRE}$ using open loop control while the bus capacitor $C_{BUS}$ is charging and the magnitude of the bus voltage $V_{BUS}$ is less than the bus voltage threshold $V_{TH-BUS}$. When the magnitude of the bus voltage $V_{BUS}$ reaches or exceeds the bus voltage threshold $V_{TH-BUS}$, the control circuit 340 may then begin to control the flyback converter circuit 320 using closed loop control (e.g., by adjusting the on-time $t_{ON}$ of the FET Q312 in response to the magnitude of the bus voltage feedback signal $V_{BUS-FB}$) to regulate the magnitude of the bus voltage $V_{BUS}$ towards the target bus voltage $V_{BUS-TRGT}$.

Figure 5A:
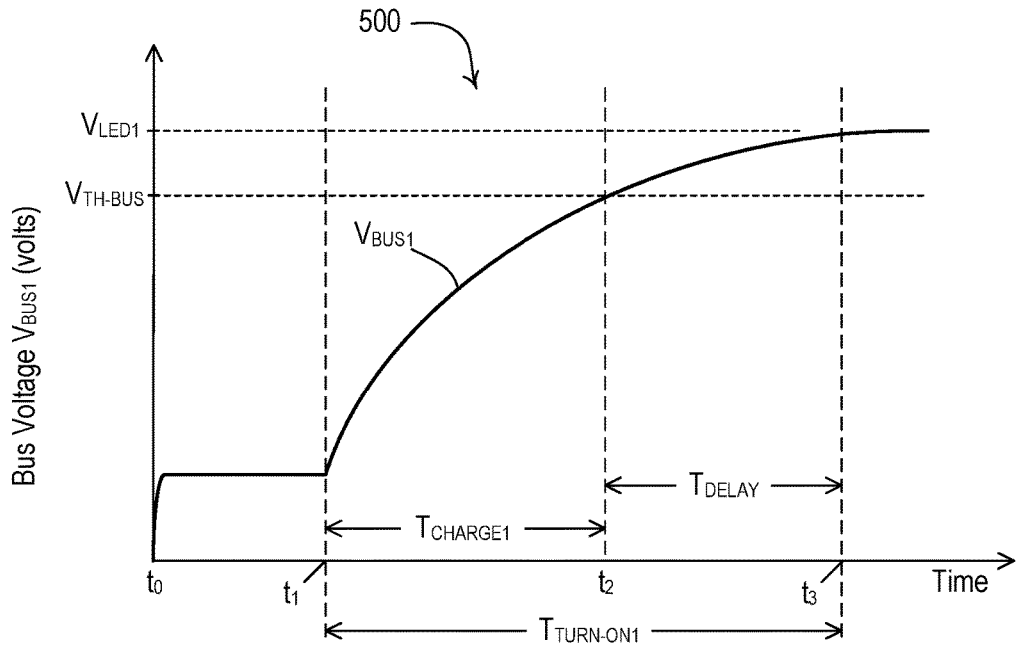
FIGS. 5A and 5B show example waveforms of a bus voltage of the LED driver of FIG. 3 turning on two different LED light sources.
Figure 5B:
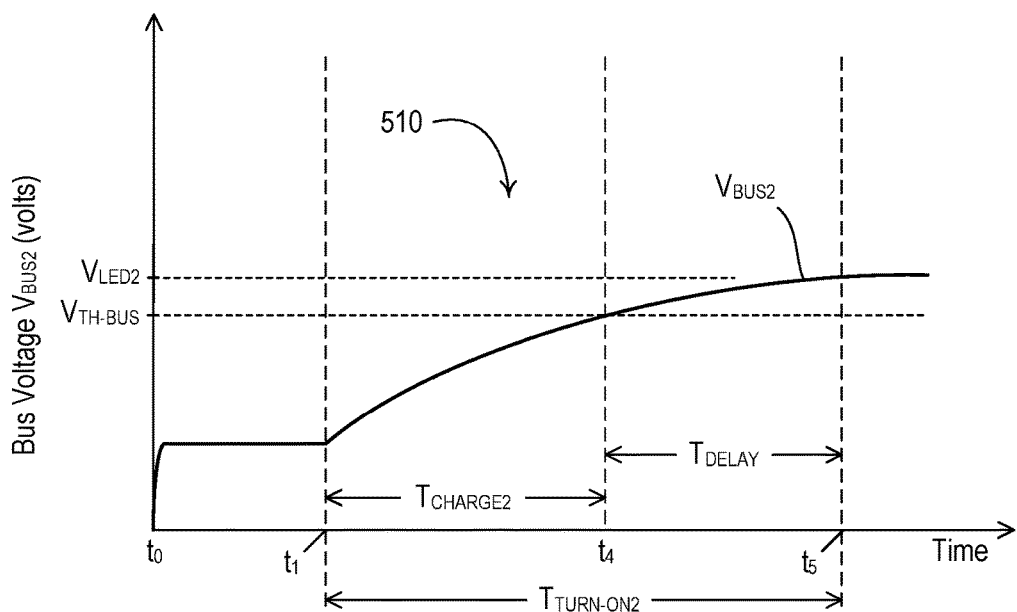

FIGS. 5A and 5B show example waveforms of bus voltages $V_{BUS1}$, $V_{BUS2}$ of an LED driver while the LED driver (e.g., the LED driver 300) is turning on two different LED light sources. For example, FIG. 5A shows a waveform 500 of the first bus voltage $V_{BUS1}$ when turning on an LED light source that has a first learned load voltage $V_{LED1}$ of approximately 38 volts and FIG. 5B shows a waveform 510 of the second bus voltage $V_{BUS2}$ when turning on an LED light source that has a second learned load voltage $V_{LED2}$ of approximately 15 volts. FIGS. 5A and 5B both show the magnitude of the bus voltage $V_{BUS}$ with respect to time when power is first applied to the LED driver to turn on the LED light sources.

After power is applied at time $t_0$, a control circuit (e.g., the control circuit 340) of the LED driver may execute a startup routine (e.g., a boot mode) until time $t_1$ when the control circuit begins controlling a power converter circuit (e.g., the flyback converter circuit 320) to charge a bus capacitor across which the bus voltages $V_{BUS1}$, $V_{BUS2}$ are produced. The magnitude of the first bus voltage $V_{BUS1}$ may exceed a charging threshold, e.g., a bus voltage threshold $V_{TH-BUS}$, which may be function of the first learned load voltage $V_{LED1}$ (e.g., $V_{TH-BUS}=0.85 \cdot V_{LED1}$), at time $t_2$ as shown in FIG. 5A. While the bus capacitor is charging for a first charging time period $T_{CHARGE1}$ between times $t_1$ and $t_2$, the control circuit may control the power converter circuit using open loop control with an operating parameter determined as a function of the first learned load voltage $V_{LED1}$ (e.g., as described above). After the first bus voltage $V_{BUS1}$ exceeds the bus voltage threshold $V_{TH-BUS}$ at time $t_2$, the control circuit may control the power converter circuit using closed loop control to regulate the magnitude of the first bus voltage $V_{BUS1}$ towards a target bus voltage. The control circuit may control the power converter circuit using closed loop control for a control loop delay period $T_{DELAY}$ from time $t_2$ until the LED light source turns on at time $t_3$. Thus, the LED light source may turn on after a turn-on delay time period $T_{TURN-ON1}$ from when the control circuit begins controlling the power converter circuit at time $t_1$.

Similarly, as shown in FIG. 5B, the magnitude of the second bus voltage $V_{BUS2}$ may exceed the bus voltage threshold $V_{TH-BUS}$ at time $t_4$. The value of the bus voltage threshold $V_{TH-BUS}$ may be lower in FIG. 5B than in FIG. 5A since the second learned load voltage $V_{LED2}$ is lower than the first learned load voltage $V_{LED1}$. The control circuit may control the power converter circuit with an operating parameter using open loop control for a second charging time period $T_{CHARGE2}$ between times $t_1$ and $t_4$. Since the control circuit may determine the operating parameter as a function of the first and second learned load voltage $V_{LED1}$, $V_{LED2}$, the values of the first and second charging time periods $T_{CHARGE1}$, $T_{CHARGE2}$ may be approximately equal. After the magnitude of the second bus voltage $V_{BUS2}$ exceeds the bus voltage threshold $V_{TH-BUS}$ at time $t_4$, the control circuit may control the power converter circuit using closed loop control for the control loop delay period $T_{DELAY}$ from time $t_4$ until the LED light source turns on at time $t_5$, such that the LED light source may turn on after a turn-on delay time period $T_{TURN-ON2}$. Since the control loop delay period $T_{DELAY}$ may be a constant parameter (e.g., independent of the learned load voltages $V_{LED1}$, $V_{LED2}$), the first and second turn-on delay time periods $T_{TURN-ON1}$, $T_{TURN-ON2}$ may be approximately equal.

Figure 6:
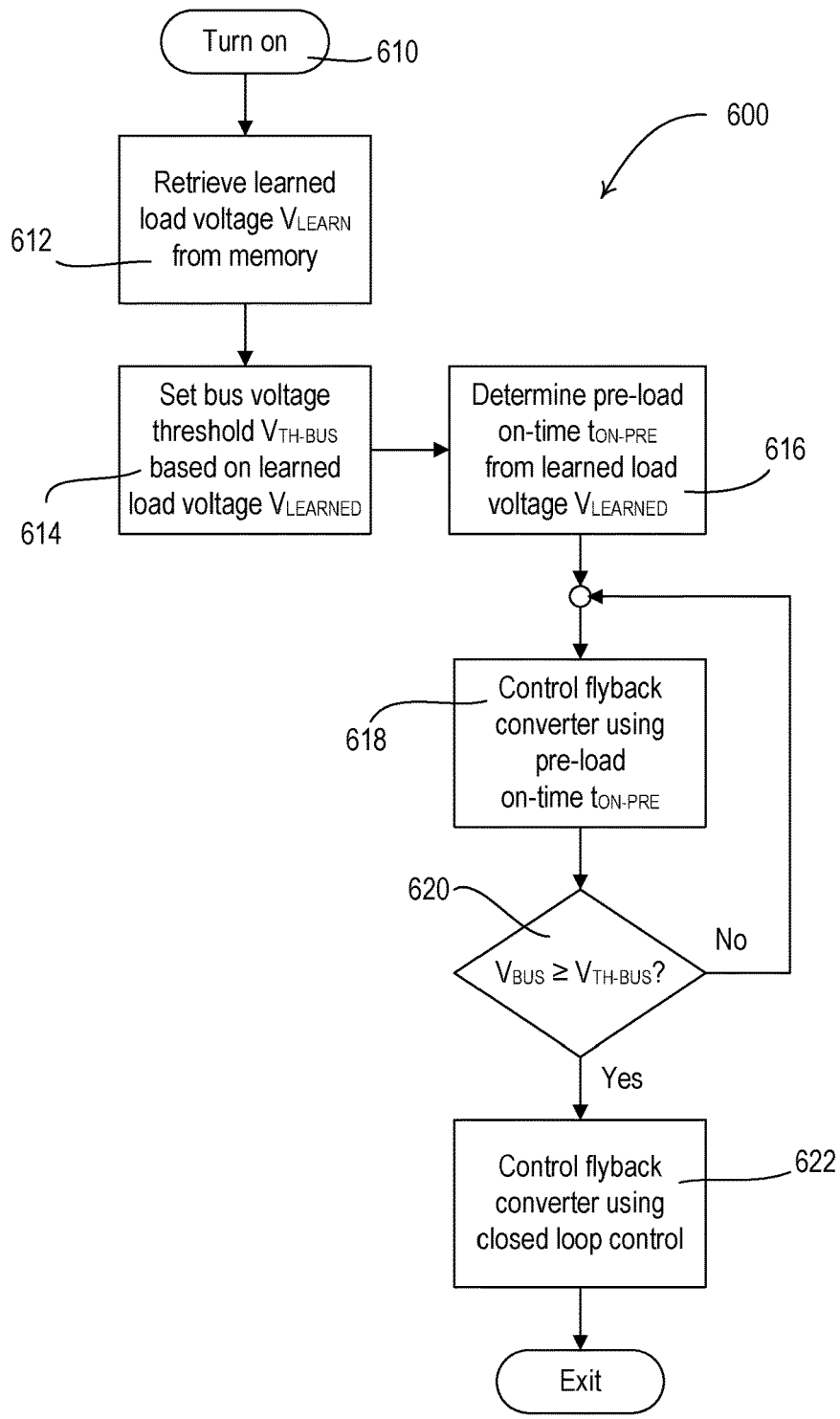
FIG. 6 is a simplified flowchart of another example turn-on procedure for controlling a power converter circuit of an LED driver.

FIG. 6 is a simplified flowchart of an example turn-on procedure 600 for controlling a power converter circuit of an LED driver (e.g., the flyback converter circuit 320 of the LED driver 300). For example, the turn-on procedure 600 may be executed by a control circuit (e.g., the control circuit 340) at step 610 in response to receiving a command to turn on a LED light source and/or in response to power being applied to the LED driver to turn on the LED light source. The control circuit may retrieve a learned load characteristic (e.g., the learned load voltage $V_{LEARNED}$) from memory at step 612 and may determine the value of a charging threshold (e.g., the bus voltage threshold $V_{TH-BUS}$) as a function of the learned load voltage $V_{LEARNED}$ (e.g., $V_{TH-BUS}=\eta \cdot V_{LEARNED}$, where $\eta$ may be 0.85) at step 614. The control circuit may determine an operating parameter for the power converter circuit (e.g., the pre-load on-time $t_{ON-PRE}$) as a function of the learned load voltage $V_{LEARNED}$ at step 616 and control the power converter circuit using the pre-load on-time $t_{ON-PRE}$ at step 618. While the magnitude of the bus voltage $V_{BUS}$ is less than the bus voltage threshold $V_{TH-BUS}$ at step 620, the control circuit may continue to control the power converter circuit using the pre-load on-time $t_{ON-PRE}$ at step 618. When the magnitude of the bus voltage $V_{BUS}$ is greater than or equal to the bus voltage threshold $V_{TH-BUS}$ at step 620, the control circuit may begin to control the power converter circuit using closed loop control at step 622 to regulate the magnitude of the bus voltage $V_{BUS}$ towards a target bus voltage, before the turn-on procedure 600 exits.

Figure 7:
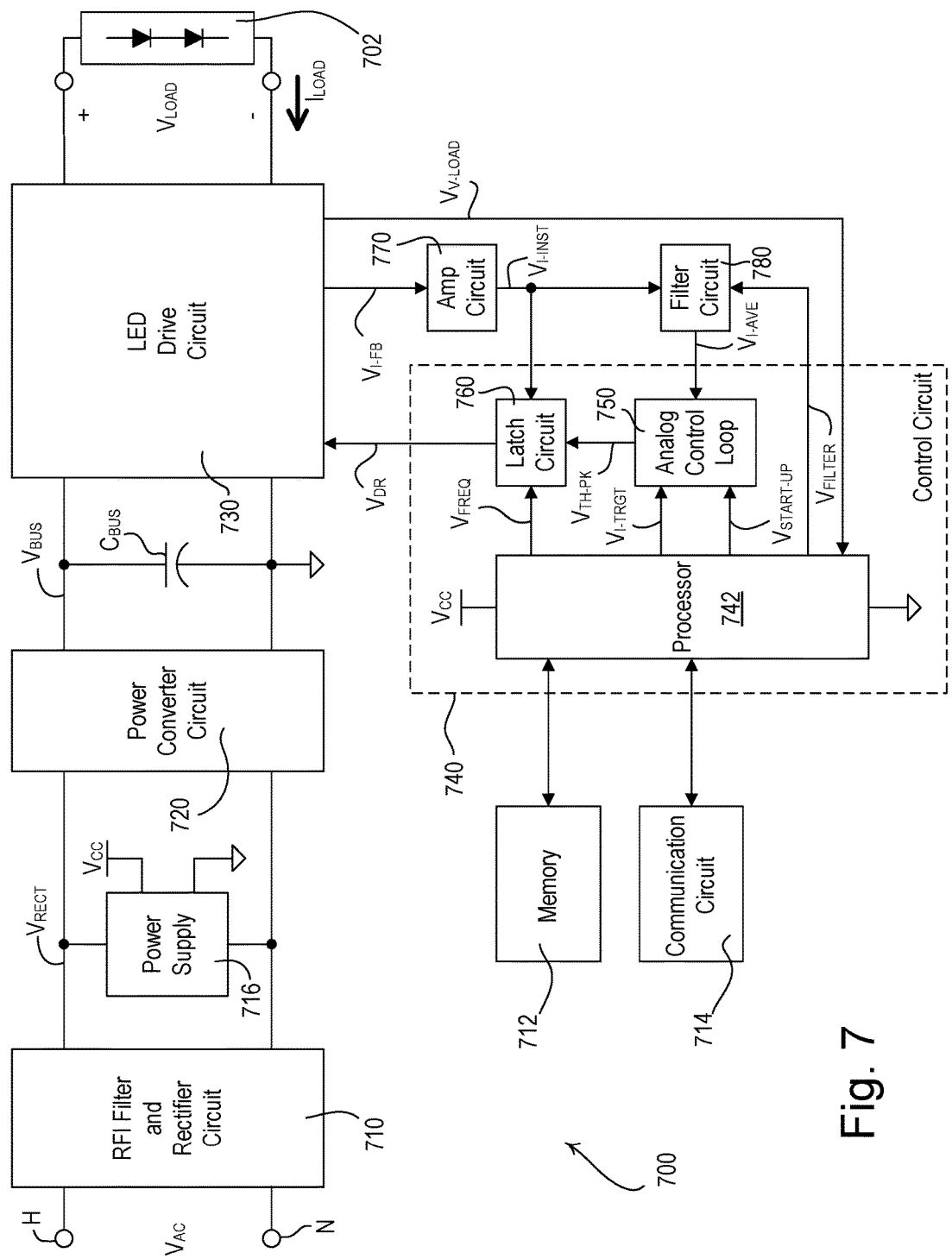
FIG. 7 is a simplified block diagram of another example LED driver.

FIG. 7 is a simplified block diagram of a load control device, such as a LED driver 700 for controlling the intensity of an LED light source 702 (e.g., an LED light engine).

The LED light source 702 is shown as a plurality of LEDs connected in series but may comprise a single LED or a plurality of LEDs connected in parallel or a suitable combination thereof, depending on the particular lighting system. In addition, the LED light source 702 may alternatively comprise one or more organic light-emitting diodes (OLEDs). The LED driver 700 may be adapted to work with a plurality of different LED light sources, which may be rated at different magnitudes of load current and voltage.

The LED driver 700 may comprise a hot terminal H and a neutral terminal N for receiving an AC voltage $V_{AC}$ from an AC power source (not shown). The LED driver 700 may comprise an RFI filter and rectifier circuit 710, which may receive the AC voltage $V_{AC}$. The RFI filter and rectifier circuit 710 may operate to minimize the noise provided on the AC power source and to generate a rectified voltage $V_{RECT}$. The LED driver 700 may comprise a power converter circuit 720 (e.g., a first power converter circuit) and a load regulation circuit, e.g., an LED drive circuit 730 (e.g., a second power converter circuit). The power converter circuit 720 may receive the rectified voltage $V_{RECT}$ and generate a variable DC bus voltage $V_{BUS}$ across a bus capacitor $C_{BUS}$. The power converter circuit 720 may comprise any suitable power converter circuit for generating an appropriate bus voltage, such as, for example, a boost converter, a buck converter, a buck-boost converter, a flyback converter, a single-ended primary-inductance converter (SEPIC), a Ćuk converter, or other suitable power converter circuit. The power converter circuit 720 may also provide electrical isolation between the AC power source and the LED light source 702, and operate as a PFC circuit to adjust the power factor of the LED driver 100 towards a power factor of one.

The LED drive circuit 730 may receive the bus voltage $V_{BUS}$ and control the amount of power delivered to the LED light source 702 so as to control the intensity of the LED light source. For example, the LED drive circuit 730 may comprise a buck converter, as will be described in greater detail below. To control the amount of power delivered to the LED light source 702, the LED drive circuit 730 may be configured to control an average magnitude of a load current $I_{LOAD}$ conducted through the LED light source 702.

The LED driver 700 may include a control circuit 740 for controlling the operation of the power converter circuit 720 and the LED drive circuit 730. The control circuit 740 may comprise, for example, a controller or any other suitable processing device, such as, for example, a microcontroller, a programmable logic device (PLD), a microprocessor, an application specific integrated circuit (ASIC), or a field-programmable gate array (FPGA). The control circuit 740 may be configured to control the LED drive circuit 730 to control the average magnitude of the load current $I_{LOAD}$ conducted through the LED light source to control the amount of power delivered to the LED light source. The control circuit 740 may be configured to control the LED drive circuit 730 to turn the LED light source 702 on and off and to adjust (e.g., dim) a present intensity $L_{PRES}$ of the LED light source 702 towards a target intensity $L_{TRGT}$, which may range across a dimming range of the LED light source, e.g., between a low-end intensity $L_{LE}$ (e.g., approximately 0.1%- 1.0%) and a high-end intensity $L_{HE}$ (e.g., approximately 100%).

The control circuit 740 may be configured to fade (e.g., gradually adjust over a period of time) the target intensity $L_{TRGT}$ (and thus the present intensity $L_{PRES}$) of the LED light source 702. The control circuit 740 may be configured to fade the LED light source 702 from off to on by slowly increasing the present intensity $L_{PRES}$ of the LED light source from a minimum fading intensity $L_{FADE-MIN}$, which may be less than the low-end intensity $L_{LE}$ (e.g., such as approximately 0.02%), to the target intensity $L_{TRGT}$. The control circuit 740 may be configured to fade the LED light source 702 from on to off by slowly decreasing the present intensity $L_{PRES}$ of the LED light source from an initial intensity greater than or equal to the low-end intensity $L_{LE}$ to the minimum fading intensity $L_{FADE-MIN}$ at which point the control circuit 740 may turn off the LED light source.

The control circuit 740 may be coupled to a memory 712 configured to store operational characteristics of the LED driver 700 (e.g., the target intensity $L_{TRGT}$, the low-end intensity $L_{LE}$, the high-end intensity $L_{HE}$, etc.). The memory 712 may be implemented as an external integrated circuit (IC) or as an internal circuit of the control circuit 740. The LED driver 700 may also comprise a communication circuit 714, which may be coupled to, for example, a wired communication link or a wireless communication link, such as a radio-frequency (RF) communication link or an infrared (IR) communication link. The control circuit 740 may be configured to determine the target intensity $L_{TRGT}$ of the LED light source 702 or the operational characteristics stored in the memory 712 in response to digital messages received via the communication circuit 714. In response to receiving a command to turn on the LED light source 702, the control circuit 740 may be configured to execute the turn-on routine. The LED driver 700 may further comprise a power supply 716, which may receive the rectified voltage $V_{RECT}$ and generate a direct-current (DC) supply voltage $V_{CC}$ (e.g., approximately 5 volts) for powering the low-voltage circuitry of the LED driver. In addition, the power supply 716 may generate one or more additional supply voltages, for example, for powering control circuitry of the power converter circuit 720 and/or the LED drive circuit 730.

The control circuit 740 may comprise a digital control circuit, such as a processor 742, which may be, for example, a microprocessor, a programmable logic device (PLD), a microcontroller, an application specific integrated circuit (ASIC), a field-programmable gate array (FPGA), or other suitable processing device or controller. The control circuit 740 may also comprise an analog control loop circuit 750. The processor 742 and the analog control loop circuit 750 may operate together to control the LED driver circuit 730 to adjust the average magnitude of the load current $I_{LOAD}$ towards a target current $I_{TRGT}$. The target current $I_{TRGT}$ may be dependent upon the target intensity $L_{TRGT}$ (e.g., a function of the target intensity $L_{TRGT}$). The processor 742 may generate a target-current control signal $V_{I-TRGT}$, which may have a DC magnitude or a duty cycle that may indicate the target current $I_{TRGT}$. The processor 742 may control the DC magnitude or the duty cycle of the target-current control signal $V_{I-TRGT}$ based on the target intensity $L_{TRGT}$ of the LED light source 702.

The control circuit 740 may also comprise a latch circuit 760 that may generate a drive signal $V_{DR}$ for controlling the operation of the LED drive circuit 730 (e.g., for rendering a switching transistor of the LED drive circuit 730 conductive and non-conductive to regulate the average magnitude of the load current $I_{LOAD}$ towards the target current $I_{TRGT}$). The processor 742 may generate a frequency control signal $V_{FREQ}$ that may set an operating frequency $f_{OP}$ of the LED drive circuit 730. In response to the frequency control signal $V_{FREQ}$, the latch circuit 760 may control the drive signal $V_{DR}$ to render the switching transistor of the LED drive circuit 730 conductive to start a cycle of the LED drive circuit, at which time the LED drive circuit may begin to conduct an inductor current $I_L$ conducted through an inductor (not shown) of the LED drive circuit 730. The analog control loop circuit 750 may generate a peak current threshold $V_{TH-PK}$, which may be used by the latch circuit 760 to render the switching transistor of the LED drive circuit 730 non-conductive in response to the magnitude of the inductor current $I_L$.

The LED driver 700 may comprise an amplifier circuit 770, which may receive a current feedback signal $V_{I-FB}$ from the LED drive circuit 730. The amplifier circuit 770 may amplify the current feedback signal $V_{I-FB}$ to generate an instantaneous current feedback signal $V_{I-INST}$, which may indicate an instantaneous magnitude of the inductor current $I_L$ flowing through the inductor of the LED drive circuit 730.

The LED driver 700 may further comprise a filter circuit 780, such as a boxcar filter circuit. The filter circuit 780 may receive the instantaneous current feedback signal $V_{I-INST}$ and generate a filtered feedback signal, e.g., an average current feedback signal $V_{I-AVE}$, which may indicate an average magnitude of the inductor current $I_L$ flowing through the inductor of the LED drive circuit 730 (e.g., over a specific time window). The processor 742 may generate a filter control signal $V_{FILTER}$ (e.g., a filter control signal) for controlling the operation of the filter circuit 780, e.g., to control when the filter circuit 780 filters the instantaneous current feedback signal $V_{I-INST}$. For example, the processor 742 may control the filter control signal $V_{FILTER}$ to allow the filter circuit 780 to filter the instantaneous current feedback signal $V_{I-INST}$ over a filter window period $T_{FILTER}$ during each cycle of the LED drive circuit 730. The processor 742 may control the filter control signal $V_{FILTER}$ in a manner that is synchronous with the frequency control signal $V_{FREQ}$, e.g., to start a cycle of the LED drive circuit 730 at the beginning of the filter window period $T_{FILTER}$. For example, the filter window period $T_{FILTER}$ may have the same length during each cycle of the LED drive circuit 730 independent of the frequency of the frequency control signal $V_{FREQ}$. The magnitude of the average current feedback signal $V_{I-AVE}$ may indicate the average magnitude of the inductor current $I_L$ during the filter window period $T_{FILTER}$ (e.g., while the filter circuit 780 is filtering the instantaneous current feedback signal $V_{I-INST}$).

The analog control loop circuit 750 of the control circuit 740 may receive the average current feedback signal $V_{I-AVE}$ and the latch circuit 760 may receive the instantaneous current feedback signal $V_{I-INST}$. The analog control loop circuit 750 may adjust the magnitude of the peak current threshold $V_{TH-PK}$ in response to the target-current control signal $V_{I-TRGT}$ and the average current feedback signal $V_{I-AVE}$. The latch circuit 760 may control the drive signal $V_{DR}$ to render the switching transistor of the LED drive circuit 730 conductive in response to the frequency control signal $V_{FREQ}$ (e.g., at the beginning of a cycle of the LED drive circuit 730). The latch circuit 760 may control the drive signal $V_{DR}$ to render the switching transistor non-conductive in response to the peak current threshold $V_{TH-PK}$ and the instantaneous current feedback signal $V_{I-INST}$. After rendering the switching transistor of the LED drive circuit 730 non-conductive, the latch circuit 760 may remain in a latched state and maintain the switching transistor non-conductive until the beginning of the next cycle of the LED drive circuit 730.

The control circuit 740 may be configured to determine or learn (e.g., measure or receive an indication of) one or more operational characteristics of the LED light source 702 (e.g., learned load characteristics). For example, the control circuit 740 may be configured to determine a voltage representative of the magnitude of the load voltage $V_{LOAD}$. The magnitude of the load voltage $V_{LOAD}$ generated across the LED light source 702 may be dependent upon the magnitude of the load current $I_{LOAD}$ (e.g., the target load current $I_{TRGT}$ to which the control circuit 740 is regulating the load current $I_{LOAD}$) as well as the internal circuitry of the LED light source. The control circuit 740 may be configured to determine (e.g., measure) the magnitude of the load voltage $V_{LOAD}$ and/or store the measurement in the memory 712 as a learned load voltage $V_{LEARNED}$. The control circuit 740 may be configured to determine (e.g., measure) the magnitude of the load voltage $V_{LOAD}$ using a load voltage feedback signal $V_{V-LOAD}$ received from the LED drive circuit 730. For example, the LED drive circuit 730 may comprise a resistive divider circuit (not shown) coupled across the LED light source 702 for generating the load voltage feedback signal $V_{V-LOAD}$ as a scaled load voltage. The load voltage feedback signal $V_{V-LOAD}$ may be received by an analog-to-digital converter (ADC) of the processor 742 for learning the magnitude of the load voltage $V_{LOAD}$.

The control circuit 740 may be configured to determine (e.g., measure) the magnitude of the load voltage $V_{LOAD}$ when the target intensity $L_{TRGT}$ is at or near the low-end intensity $L_{LE}$. For example, the control circuit 740 may be configured to determine (e.g., measure) the magnitude of the load voltage $V_{LOAD}$ while the control circuit 740 is fading the LED light source 702 from on to off, for example, while the average magnitude of the load current $I_{LOAD}$ is within a measurement window that may range from a maximum learning threshold $I_{LEARN-MAX}$ to a minimum learning threshold $I_{LEARN-MIN}$. The maximum learning threshold $I_{LEARN-MAX}$ and the minimum learning threshold $I_{LEARN-MIN}$ may be functions of a rated (or maximum) current $I_{RATED}$ of the LED light source 702, for example, $0.0020 \cdot I_{RATED}$ and $0.0002 \cdot I_{RATED}$, respectively.

The control circuit 740 may be configured to control the LED drive circuit 730 using the learned load voltage $V_{LEARNED}$. For example, the control circuit 740 may be configured to control the LED drive circuit 730 in response to the learned load voltage $V_{LEARNED}$ when turning on the LED light source 702. The control circuit 740 may be configured to charge (e.g., "pre-charge") an output capacitor (not shown) of the LED drive circuit 730 prior to attempting to turn on the LED light source 702. In response to receiving a command to turn on the LED light source 702 and/or in response to power being applied to the LED driver 700 to turn on the LED light source, the control circuit 740 may pre-charge the output capacitor until the magnitude of the load voltage $V_{LOAD}$ reaches or exceeds a pre-charge voltage threshold $V_{TH-PC}$, which may be, for example, a function of the learned load voltage $V_{LEARNED}$ (e.g., as will be described in greater detail below). The pre-charging of the output capacitor may allow the LED driver 700 to turn-on the LED light source 702 quickly and consistently, e.g., when fading on to the low-end intensity $L_{LE}$.

The control circuit 740 may be configured to determine an operating parameter (e.g., a pre-load parameter) as a function of the learned load voltage $V_{LEARNED}$ and use the operating parameter to control the LED drive circuit 730 to pre-charge the output capacitor of the LED drive circuit 730 prior to turning the LED light source 702 on (e.g., as will be described in greater detail below). For example, the control circuit 740 may be configured to determine the DC magnitude or the duty cycle of the target-current control signal $V_{I-TRGT}$ to use while pre-charging the output capacitor of the LED drive circuit 730 as a function of the learned load voltage $V_{LEARNED}$. In addition, the processor 742 may generate a start-up control signal $V_{START-UP}$ for controlling the analog control loop circuit 750 while pre-charging the output capacitor of the LED drive circuit 730 to maintain the output of the analog control loop circuit 750 at a predetermined voltage.

After the magnitude of the load voltage $V_{LOAD}$ reaches or exceeds the pre-charge voltage threshold $V_{TH-PC}$, the processor 742 may control the start-up control signal $V_{START-UP}$ to allow the analog control loop circuit 750 to control the LED drive circuit 730 using closed loop control in response to the current feedback signal $V_{I-FB}$ to regulate the magnitude of the load current $I_{LOAD}$ towards the target current $I_{TRGT}$.

Figure 8:
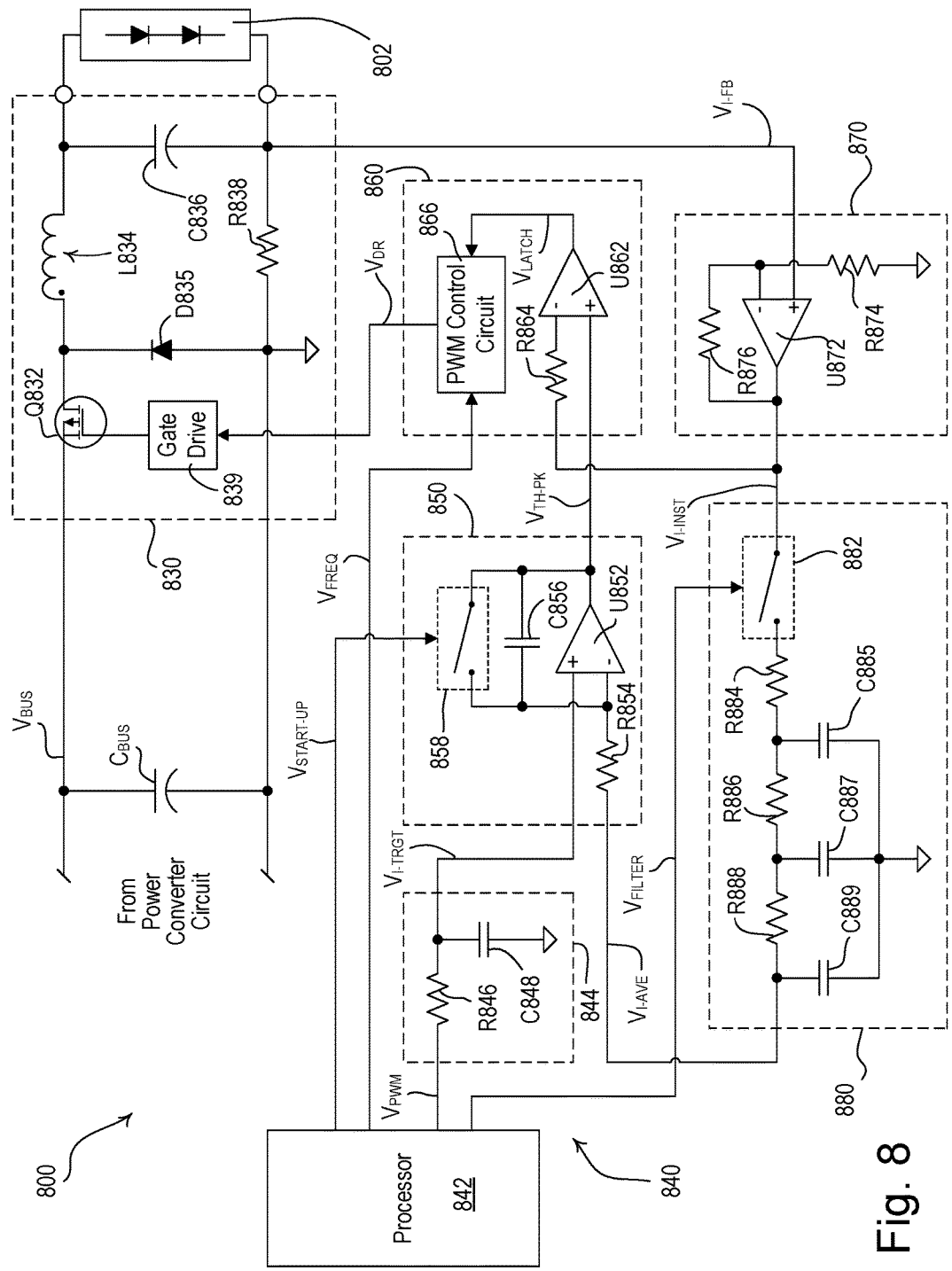
FIG. 8 is a simplified schematic diagram of another example LED driver.

FIG. 8 is a simplified schematic diagram of a load control device, e.g., an LED driver 800 (such as the LED driver 700 of FIG. 1) for controlling the intensity of an LED light source 802. The LED driver 800 may comprise a bus capacitor $C_{BUS}$ for storing a bus voltage $V_{BUS}$, which may be generated by a first power converter circuit (e.g., the power converter circuit 720 of the LED driver 700). The LED driver 800 may comprise a second power converter circuit, e.g., an LED drive circuit 830, which may be configured to control the magnitude of a load current $I_{LOAD}$ conducted through the LED light source 802. The LED driver 800 may further comprise a control circuit 840, which may be a hybrid analog-digital control circuit (e.g., the control circuit 740 of the LED driver 700). The control circuit 840 may comprise a processor 842, a low-pass filter circuit 844, an analog control loop circuit (e.g., which may include an integrator circuit 850), and a latch circuit 860. The latch circuit 860 may generate a drive signal $V_{DR}$, which may be provided to the LED driver circuit 830. The LED driver 800 may further comprise an amplifier circuit 870 and a filter circuit 880 (e.g., a boxcar filter circuit) for generating an instantaneous current feedback signal $V_{I-INST}$ and an average current feedback signal $V_{I-AVE}$, respectively.

As shown in FIG. 8, the LED drive circuit 830 may comprise a buck converter. The LED drive circuit 830 may comprise a switching transistor, e.g., a field-effect transistor (FET) Q832, which may be controlled in response to the drive signal $V_{DR}$ to control the magnitude of the load current $I_{LOAD}$. The LED drive circuit 830 may also comprise an inductor L834, a switching diode D835, an output capacitor C836, and a feedback resistor R838. The drive signal $V_{DR}$ may be coupled to a gate of the FET Q832 through a gate drive circuit 839. When the FET Q832 is conductive, the inductor L834 may conduct an inductor current $I_L$ from the bus capacitor $C_{BUS}$ through the parallel combination of the output capacitor C836 and the LED light source 802. When the FET Q832 is non-conductive, the inductor L834 may conduct the inductor current $I_L$ through the switching diode D835 and the parallel combination of the output capacitor C836, and the LED light source 802. The LED light source 802 may conduct the average component of the inductor current $I_L$ and the output capacitor C836 may conduct the transient component of the inductor current $I_L$. The average magnitude of the load current $I_{LOAD}$ may be approximately equal to the average magnitude of the inductor current $I_L$.

The current feedback signal $V_{I-FB}$ may be generated across the feedback resistor R838 of the LED drive circuit 830 and may be proportional to the magnitude of the inductor current $I_L$. The current feedback signal $V_{I-FB}$ may be received by the amplifier circuit 870. The amplifier circuit 870 may comprise an operational amplifier U872 and may be configured as an non-inverting amplifier circuit. The operational amplifier U872 may have a non-inverting input that may receive the current feedback signal $V_{I-FB}$. The amplifier circuit 870 may also comprise a resistor R874 coupled between an inverting input of the operational amplifier U872 and circuit common, and a resistor R876 coupled between the inverting input and an output of the operational amplifier U872. The amplifier circuit 870 may be configured to generate the instantaneous current feedback signal $V_{I-INST}$, which may be an amplified version of the current feedback signal $V_{I-FB}$ and may indicate the instantaneous magnitude of the inductor current $I_L$.

The filter circuit 880 may filter the instantaneous current feedback signal $V_{I-INST}$ to generate the average current feedback signal $V_{I-AVE}$, which may indicate the average magnitude of the inductor current $I_L$. The filter circuit 880 may comprise a controllable switching circuit 882 and a low-pass filter circuit (e.g., a third-order low-pass filter circuit) that includes resistors R884, R886, R888 and capacitors C885, C887, C889. The processor 842 may generate a filter control signal $V_{FILTER}$ for rendering the controllable switching circuit 882 conductive and non-conductive. When the controllable switching circuit 882 is conductive, the filter circuit 880 may be configured to filter the instantaneous current feedback signal $V_{I-INST}$ to generate the average current feedback signal $V_{I-AVE}$. When the controllable switching circuit 882 is non-conductive, the capacitors C885, C887, C889 of the filter circuit 880 may maintain the magnitude of the average current feedback signal $V_{I-AVE}$ at a value that indicates the average magnitude of the inductor current $I_L$ during the period of time when the controllable switching circuit 882 was previously conductive.

The processor 842 may generate a pulse-width modulated (PWM) signal $V_{PWM}$, which may be received by the low-pass filter circuit 844 of the control circuit 840. The low-pass filter circuit 844 may be configured to generate a target-current control signal $V_{I-TRGT}$, which may have a DC magnitude that indicates the target current $I_{TRGT}$. For example, the low-pass filter circuit 844 may comprise a resistor-capacitor (RC) circuit having a resistor R846 and a capacitor C848. The processor 842 may be configured to control the duty cycle of the pulse-width modulated signal $V_{PWM}$ to adjust the magnitude of the target-current control signal $V_{I-TRGT}$.

The average current feedback signal $V_{I-AVE}$ generated by the filter circuit 880 and the target-current control signal $V_{I-TRGT}$ generated by the low-pass filter circuit 844 may be received by the integrator circuit 850. The integrator circuit 850 may comprise an operational amplifier U852 having a non-inverting input coupled to the target-current control signal $V_{I-TRGT}$ and an inverting input coupled to the average current feedback signal $V_{I-AVE}$ via a resistor R854. The integrator circuit 850 may comprise a capacitor C856 coupled between the inverting input and an output of the operational amplifier U852, such that the integrator circuit 850 may be configured to integrate the error between the average current feedback signal $V_{I-AVE}$ and the target-current control signal $V_{I-TRGT}$. The integrator circuit 850 may generate a peak current threshold $V_{TH-PK}$ having a DC magnitude that may increase or decrease by amounts dependent upon the error between the magnitude of the target-current control signal $V_{I-TRGT}$ and the average current feedback signal $V_{I-AVE}$. The integrator circuit 850 may comprise a controllable switching circuit 858 coupled in parallel with the capacitor C856. The controllable switching circuit 858 may be rendered conductive and non-conductive in response to a startup control signal $V_{START-UP}$ received from the processor 842 during a startup routine (e.g., as will be described in greater detail below).

The latch circuit 860 may receive the peak current threshold $V_{TH-PK}$ generated by the integrator circuit 850 and the instantaneous current feedback signal $V_{I-INST}$ generated by the amplifier circuit 870. The latch circuit 860 may comprise a comparator U862 configured to compare the magnitude of the instantaneous current feedback signal $V_{I-INST}$ to the magnitude of the peak current threshold $V_{TH}$. The comparator U862 may generate a latch control signal $V_{LATCH}$ at an output. When the magnitude of the instantaneous current feedback signal $V_{I-INST}$ is less than the magnitude of the peak current threshold $V_{TH}$, the comparator U862 may drive the latch control signal $V_{LATCH}$ at the output high (e.g., towards the supply voltage $V_{CC}$). When the magnitude of the instantaneous current feedback signal $V_{I-INST}$ exceeds the magnitude of the peak current threshold $V_{TH-PK}$, the comparator U862 may drive the latch control signal $V_{LATCH}$ at the output low (e.g., towards circuit common).

The processor 842 may generate a frequency control signal $V_{FREQ}$ that may set an operating frequency $f_{OP}$ of the LED drive circuit 830. The latch circuit 860 may comprise a PWM control circuit 866, which may receive the latch control signal $V_{LATCH}$ from the comparator U262 and the frequency control signal $V_{FREQ}$ from the processor 842. The PWM control circuit 866 may generate the drive signal $V_{DR}$, which may be received by the gate drive circuit 839 of the LED drive circuit 830. When the frequency control signal $V_{FREQ}$ is driven high at the beginning of a cycle of the LED driver circuit 830, the PWM control circuit 866 may drive the magnitude of the drive signal $V_{DR}$ high, which may render the FET Q832 of the LED drive circuit 830 conductive. When the magnitude of the instantaneous current feedback signal $V_{I-INST}$ exceeds the magnitude of the peak current threshold signal $V_{TH}$, the comparator U862 may drive the latch control signal $V_{LATCH}$ low, which may cause the PWM control circuit 866 to drive the magnitude of the drive signal $V_{DR}$ low. The PWM control circuit 866 may maintain the magnitude of the drive signal $V_{DR}$ low until the processor 842 drives the magnitude of the frequency control signal $V_{FREQ}$ high once again at the end of the present cycle and the beginning of the next cycle of the LED drive circuit 830.

Figure 9A:
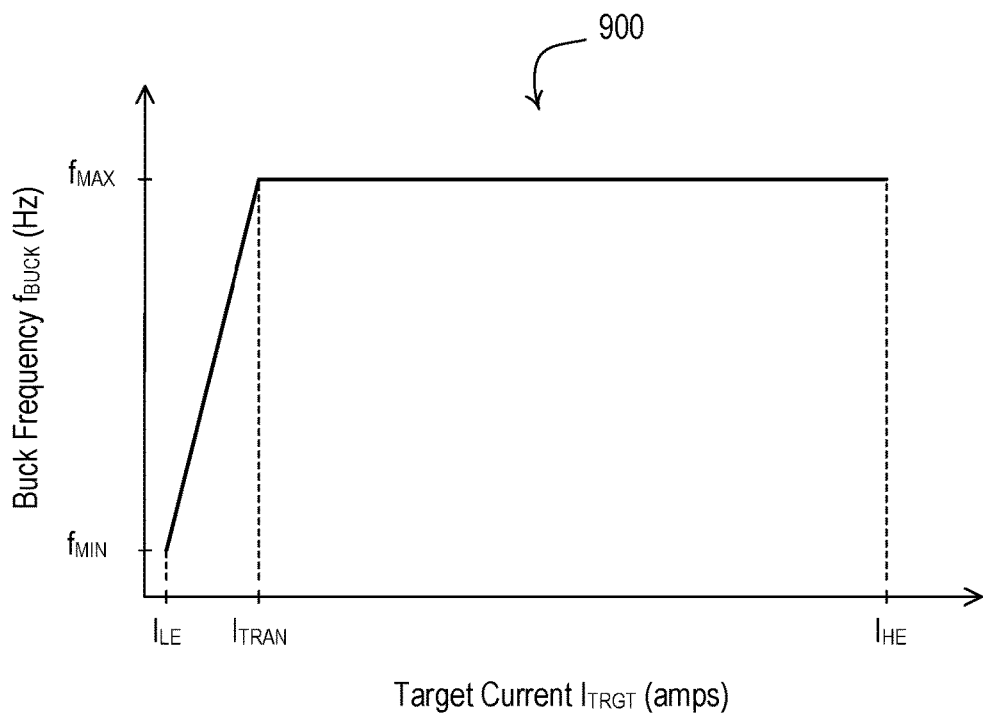
FIG. 9A is an example plot of a relationship between an operating frequency and a target current of the LED driver of FIG. 8.
Figure 9B:
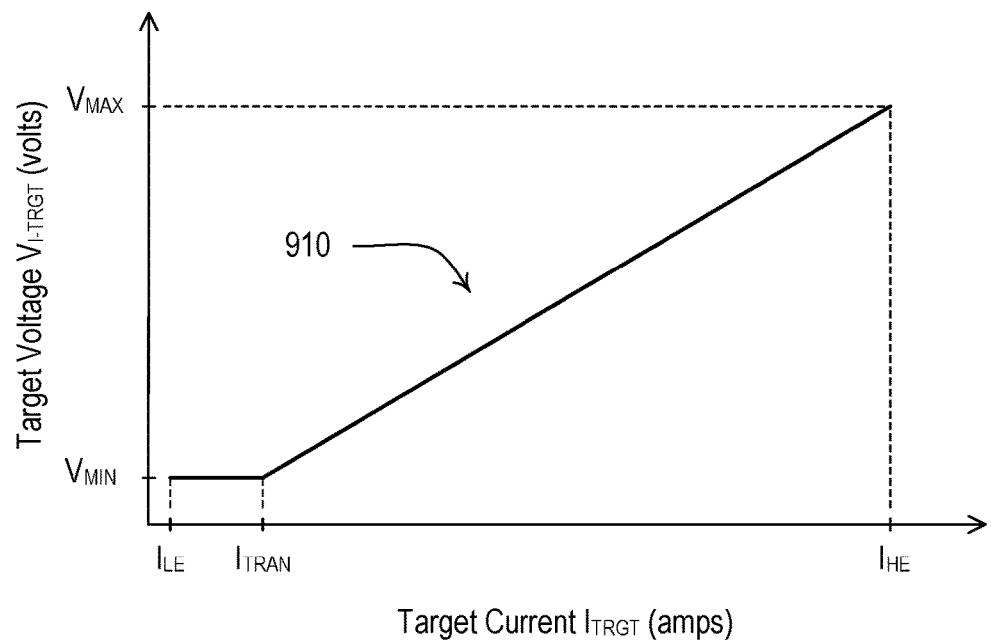
FIG. 9B is an example plot of a relationship between a magnitude of a target-current control signal and the target current of the LED driver of FIG. 8.

The processor 842 may control the frequency of the frequency control signal $V_{FREQ}$ and the duty cycle of the pulse-width modulated control signal $V_{PWM}$ (and thus the magnitude of the target-current control signal $V_{I-TRGT}$) in dependence upon the target current $I_{TRGT}$ of the LED light source 802 using open loop control. FIG. 9A is an example plot of a relationship 900 between the frequency of the frequency control signal $V_{FREQ}$ (e.g., the operating frequency $f_{OP}$ of the LED drive circuit 830) and the target current $I_{TRGT}$. FIG. 9B is an example plot of a relationship 910 between the magnitude of the target-current control signal $V_{I-TRGT}$ and the target current $I_{TRGT}$. For example, the target current $I_{TRGT}$ may range between a high-end current $I_{HE}$ (e.g., approximately 150 mA) at the high-end intensity $L_{HE}$ and a low-end current $I_{LE}$ (e.g., approximately 150 µA) at the low-end intensity $L_{LE}$.

The processor 842 may operate in first and second modes of operation depending upon whether the target current $I_{TRGT}$ is less than or greater than approximately a transition current $I_{TRAN}$ (e.g., approximately 16.8 mA). Near the low-end intensity $L_{LE}$ (e.g., when the target current $I_{TRGT}$ is less than approximately the transition current $I_{TRAN}$), the processor 842 may operate in the first operating mode during which the processor 842 may adjust the frequency of the frequency control signal $V_{FREQ}$ between a minimum operating frequency $f_{MIN}$ and a maximum operating frequency $f_{MAX}$ (e.g., linearly) with respect to the target current $I_{TRGT}$ while holding the magnitude of the target-current control signal $V_{I-TRGT}$ constant (e.g., at a minimum voltage $V_{MIN}$). Near the high-end intensity $L_{HE}$ (e.g., when the target current $I_{TRGT}$ is greater than or equal to approximately the transition current $I_{TRAN}$), the processor 842 may operate in the second operating mode during which the processor 842 may adjust the magnitude of the target-current control signal $V_{I-TRGT}$ between the minimum voltage $V_{MIN}$ and a maximum voltage $V_{MAX}$ (e.g., linearly) with respect to the target current $I_{TRGT}$ while holding the frequency control signal $V_{FREQ}$ constant (e.g., at the maximum operating frequency $f_{MAX}$). For example, the maximum operating frequency $f_{MAX}$ may be approximately 140 kHz and the minimum operating frequency $f_{MIN}$ may be approximately 1250 Hz. For example, the maximum voltage $V_{MAX}$ may be approximately 3.3 V and the minimum voltage $V_{MIN}$ may be approximately 44 mV.

Figure 10A:
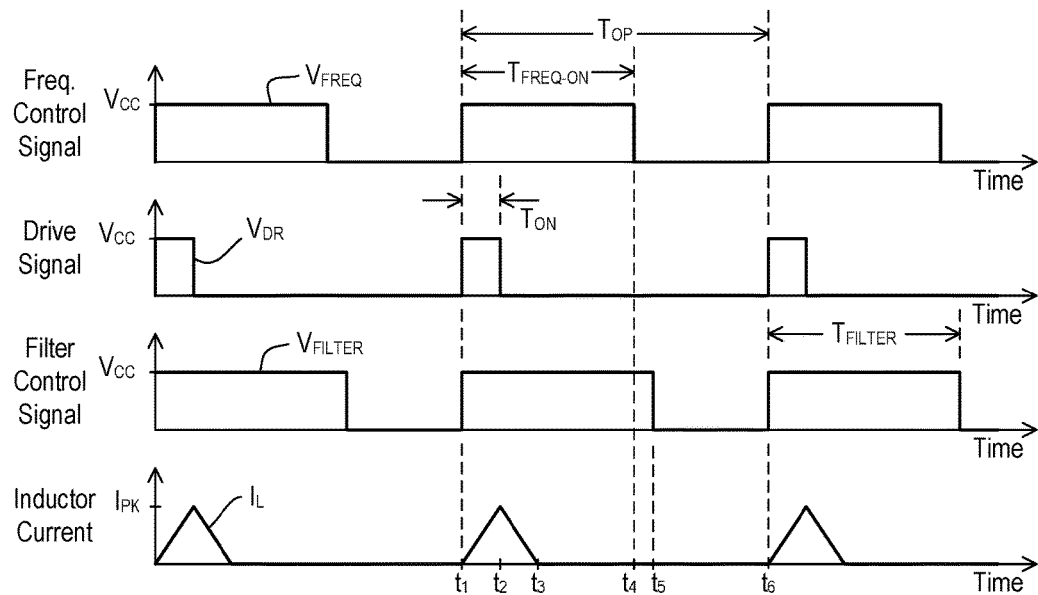
FIGS. 10A and 10B show example waveforms illustrating the operation of the LED driver of FIG. 8.
Figure 10B:
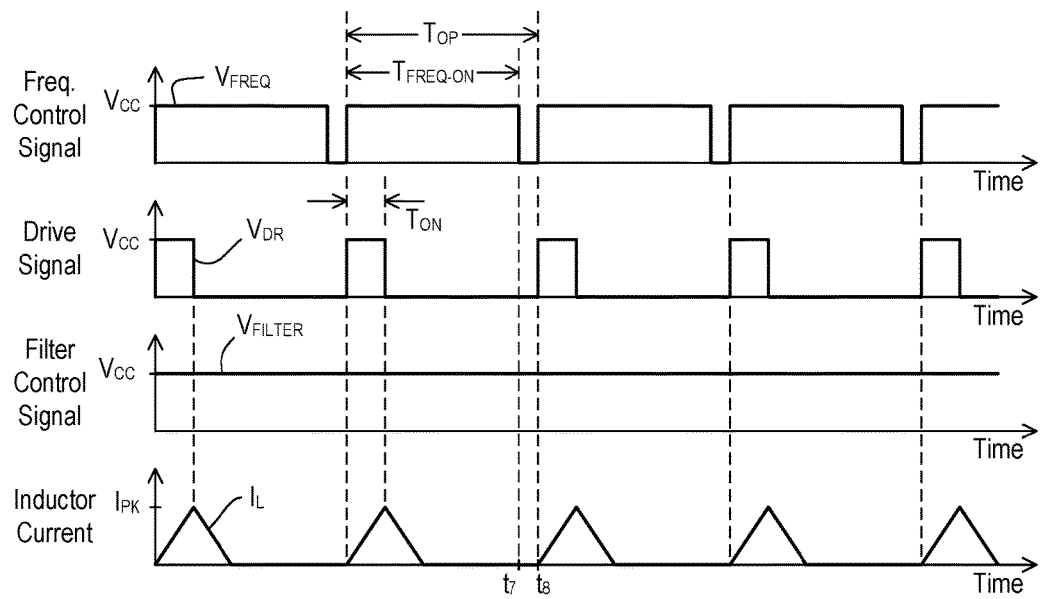

FIGS. 10A and 10B show example waveforms illustrating the operation of the LED driver 800 shown in FIG. 8. FIG. 10A shows example waveforms illustrating the operation of the LED driver 800 when the target current $I_{TRGT}$ is less than the transition current $I_{TRAN}$. The processor 842 may generate the frequency control signal $V_{FREQ}$ to set the operating frequency $f_{OP}$ of the LED drive circuit 830. For example, an operating period $T_{OP}$ of the LED drive circuit 830 may be equal to the period of the frequency control signal $V_{FREQ}$. The processor 842 may set the operating frequency $f_{OP}$ (and thus the operating period $T_{OP}$) in dependence upon the target current $I_{TRGT}$ (e.g., as shown in FIG. 9A). The processor 842 may generate the frequency control signal $V_{FREQ}$ to have a predetermined on-time $T_{FREQ-ON}$, which may have the same length each cycle of the LED drive circuit 830 (e.g., independent of the frequency of the frequency control signal $V_{FREQ}$ or the target current $I_{TRGT}$).

The processor 842 may generate the filter control signal $V_{FILTER}$ in a synchronous manner with respect to the frequency control signal $V_{FREQ}$. For example, the processor 842 may drive both the filter control signal $V_{FILTER}$ and the frequency control signal $V_{FREQ}$ high at the same time to start a cycle of the LED drive circuit 830 (e.g., at time $t_1$ in FIG. 10A). At time $t_1$, the PWM control circuit 866 of the latch circuit 860 may drive the magnitude of the drive signal $V_{DR}$ high (e.g., towards the supply voltage $V_{CC}$) causing the FET Q832 of the LED drive circuit 830 to be rendered conductive. At this time, the inductor L834 of the LED drive circuit 830 may begin to conduct the inductor current $I_L$. When the instantaneous current feedback signal $V_{I-INST}$ (which may be proportional to the magnitude of the inductor current $I_L$) exceeds the magnitude of the peak current threshold signal $V_{TH}$, the PWM control circuit 866 may drive the magnitude of the drive voltage $V_{DR}$ low (e.g., towards circuit common) as shown at time $t_2$ of FIG. 10A, which may cause the FET Q832 of the LED drive circuit 830 to be rendered non-conductive. The drive signal $V_{DR}$ may be characterized by an on-time $T_{ON}$ and a period that may be equal to the operating period $T_{OP}$ as shown in FIG. 10A. The PWM control circuit 866 may render the FET Q832 conductive for the length of the on-time $T_{ON}$ of the drive signal $V_{DR}$ during each operating cycle of the LED drive circuit 830. The inductor current $I_L$ may have a peak magnitude $I_{PK}$ as shown in FIG. 10A. The magnitude of the inductor current $I_L$ may begin to decrease at time $t_2$ until the magnitude of the inductor current $I_L$ drops to zero amps at time $t_3$.

The processor 842 may drive the frequency control signal $V_{FREQ}$ low at the end of the predetermined on-time $T_{FREQ-ON}$ (e.g., at time $t_4$ in FIG. 10A). The processor 842 may drive the filter control signal $V_{FILTER}$ low at the end of a filter window period $T_{FILTER}$ (e.g., at time $t_5$ in FIG. 10A). The processor 842 may drive both the filter control signal $V_{FILTER}$ and the frequency control signal $V_{FREQ}$ high to start another cycle of the LED drive circuit 830 at the end of the operating period $T_{OP}$ (e.g., at time $t_6$ in FIG. 10A).

When the target current $I_{TRGT}$ is less than the transition current $I_{TRAN}$, the processor 842 may hold the magnitude of the target-current control signal $V_{I-TRGT}$ constant at the minimum voltage $V_{MIN}$, and linearly adjust the frequency of the frequency control signal $V_{FREQ}$ between the minimum frequency $f_{MIN}$ and the maximum frequency $f_{MAX}$ as a function of the target current $I_{TRGT}$ (e.g., as shown in FIGS. 9A and 9B). The filter circuit 880 may be configured to filter the instantaneous current feedback signal $V_{I-INST}$ during the filter window period $T_{FILTER}$ each cycle of the LED drive circuit 830. When the target current $I_{TRGT}$ is less than the transition current $I_{TRAN}$, the filter control signal $V_{FILTER}$ may be a periodic signal characterized by the operating frequency $f_{OP}$. The processor 842 may maintain the length of the filter window period $T_{FILTER}$ of the filter control signal $V_{FILTER}$ constant from one cycle of the LED driver circuit 830 to the next cycle independent of the frequency of the frequency control signal $V_{FREQ}$. A duty cycle of the filter control signal $V_{FILTER}$ may vary as the frequency of the frequency control signal $V_{FREQ}$ is adjusted.

Since the target-current control signal $V_{I-TRGT}$ and the filter window period $T_{FILTER}$ are held constant, the on-time $T_{ON}$ of the drive signal $V_{DR}$ may be approximately the same each cycle of the LED drive circuit 830 even though the frequency of the drive signal $V_{DR}$ (e.g., the operating period $T_{OP}$) may vary in dependence upon the target current $I_{TRGT}$. As a result, the peak and average magnitudes of the inductor current $I_L$ during the filter window period $T_{FILTER}$ may be approximately the same from one cycle to the next of the LED drive circuit 830 independent of the target current $I_{TRGT}$ when the target current $I_{TRGT}$ is less than the transition current $I_{TRAN}$. The length of the filter window period $T_{FILTER}$ may be sized to ensure that the inductor current $I_L$ drops to zero amps before the end of the filter window period $T_{FILTER}$ when the target current $I_{TRGT}$ is less than the transition current $I_{TRAN}$. When the target current is less than the transition current $I_{TRAN}$, the LED drive circuit 830 may be configured to operate in a discontinuous mode of operation.

FIG. 10B shows example waveforms illustrating the operation of the LED driver 800 when the target current $I_{TRGT}$ is greater than the transition current $I_{TRAN}$. When the target current $I_{TRGT}$ is greater than the transition current $I_{TRAN}$, the processor 842 may linearly adjust the magnitude of the target-current control signal $V_{I-TRGT}$ between the minimum voltage $V_{MIN}$ and the maximum voltage $V_{MAX}$ as a function of the target current $I_{TRGT}$ (e.g., as shown in FIGS. 9A and 9B). In addition, the processor 842 may hold the frequency of the frequency control signal $V_{FREQ}$ constant at the maximum operating frequency $f_{MAX}$ (e.g., causing the operating period $T_{OP}$ to be held constant at a minimum operating period $T_{MIN}$). When the target current $I_{TRGT}$ is greater than the transition current $I_{TRAN}$, the processor 842 may control the duty cycle of the filter control signal $V_{FILTER}$ to a maximum filter duty cycle (e.g., 100%). For example, the operating period $T_{OP}$ may be equal to the length of the filter window period $T_{FILTER}$ when the target current $I_{TRGT}$ is greater than the transition current $I_{TRAN}$. As a result, the processor 842 may drive the filter control signal $V_{FILTER}$ high at all times (e.g., the filter control signal $V_{FILTER}$ is a constant signal) while the target current $I_{TRGT}$ is greater than the transition current $I_{TRAN}$ as shown in FIG. 10B. The average current feedback signal $V_{I-AVE}$ may indicate the average magnitude of the inductor current $I_L$ when the target current $I_{TRGT}$ is greater than the transition current $I_{TRAN}$. Additionally or alternatively, the processor 842 may drive the filter control signal $V_{FILTER}$ high approximately all of the time (e.g., almost all of the time), for example at substantially large duty cycle (e.g., approximately 90% or greater).

Because the processor 842 varies the magnitude of the target-current control signal $V_{I-TRGT}$ as a function of the target current $I_{TRGT}$, the length of the on-time $T_{ON}$ of the drive signal $V_{DR}$ may vary as a function of the target current $I_{TRGT}$ even though the frequency of the drive signal $V_{DR}$ (e.g., the operating period $T_{OP}$) is held constant. As the target current $I_{TRGT}$ increases, the peak current $I_{PK}$ of the inductor current may increase to a point at which the LED drive circuit 830 may begin to operate in a continuous mode of operation. Since the minimum operating period $T_{MIN}$ (e.g., the operating period $T_{OP}$ when the target current $I_{TRGT}$ is greater than the transition current $I_{TRAN}$) may be equal to the length of the filter window time period $T_{FILTER}$, the processor 842 may be configured to smoothly transition the LED driver 800 between the first operating mode when the target current $I_{TRGT}$ is less than the transition current $I_{TRAN}$ and the second operating mode when the target current $I_{TRGT}$ is greater than the transition current $I_{TRAN}$.

The length of the predetermined on-time $T_{FREQ-ON}$ of the frequency control signal $T_{FREQ}$ is less than the length of the operating period $T_{OP}$ when the target current $I_{TRGT}$ is greater than the transition current $I_{TRAN}$. The processor 842 may drive the frequency control signal $T_{FREQ}$ low (e.g., at time $t_7$ in FIG. 10B) and then high (e.g., at time $t_8$) at the end of each cycle of the LED drive circuit 830. This causes the PWM control circuit 866 of the latch circuit 860 to stop maintaining the magnitude of the drive signal $V_{DR}$ low, and to drive the magnitude of the drive signal $V_{DR}$ high again when the frequency control signal $T_{FREQ}$ is driven high to begin the next cycle of the LED drive circuit 830 (e.g., at time $t_8$).

The processor 842 of the control circuit 840 may be configured to determine or learn (e.g., measure or receive an indication of) the magnitude of the load voltage $V_{LOAD}$ (e.g., developed across the capacitor C836) and/or store the measurement in memory (e.g., the memory 712) as a learned load voltage $V_{LEARNED}$ (e.g., a learned capacitor voltage). The magnitude of the load voltage $V_{LOAD}$ generated across the LED light source 802 may be dependent upon the magnitude of the load current $I_{LOAD}$ (e.g., the target load current $I_{TRGT}$ to which the control circuit 840 is regulating the load current $I_{LOAD}$) as well as the internal circuitry of the LED light source. The processor 842 may be configured to receive a load voltage feedback signal from the LED drive circuit 830 (e.g., the load voltage feedback signal $V_{V-LOAD}$ of the LED driver 100), which may be a scaled version of the load voltage $V_{LOAD}$ generated by a resistive divider circuit (not shown) of the LED drive circuit 830. The processor 842 may sample the load voltage feedback signal using an analog-to-digital converter (ADC) to measure the magnitude of the load voltage $V_{LOAD}$.

Figure 11A:
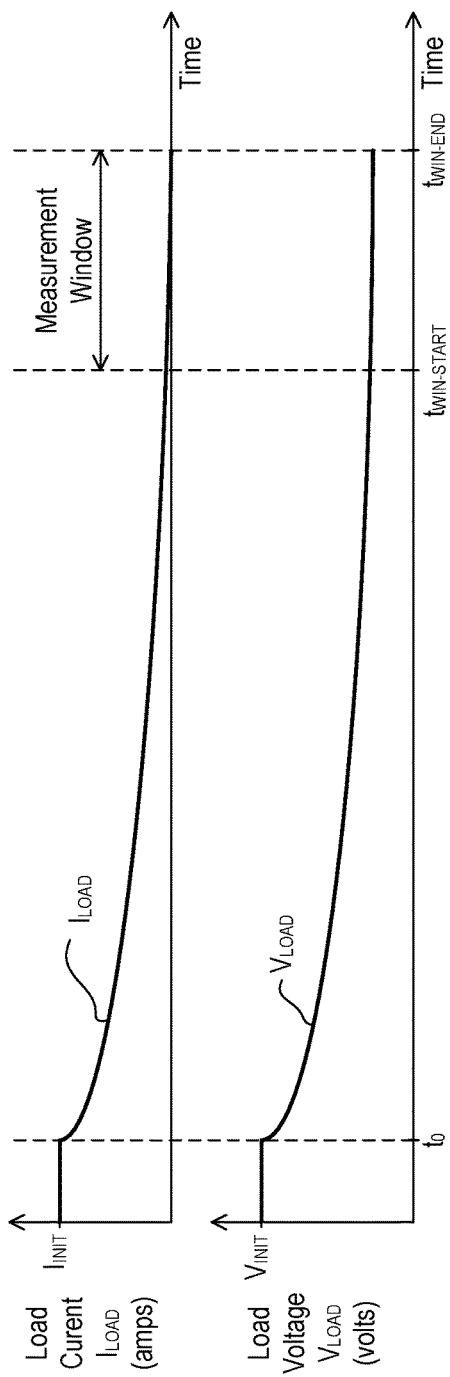
FIG. 11A shows example waveforms illustrating the operation of the LED driver of FIG. 8 when the LED driver is learning a load voltage.

FIG. 11A shows example waveforms illustrating the operation of the LED driver 800 when the processor 842 is learning the load voltage $V_{LOAD}$. The processor 842 may be configured to determine (e.g., measure) the magnitude of the load voltage $V_{LOAD}$ while the processor 842 is fading the LED light source 802 from on to off. As shown in FIG. 11A, when fading the LED light source 802 from on to off, the processor 842 may begin to decrease the average magnitude of the load current $I_{LOAD}$ from an initial current $I_{INIT}$ at time $t_0$, at which time the magnitude of the load voltage $V_{LOAD}$ may also begin to decrease, e.g., from an initial voltage $V_{INIT}$. The processor 842 may be configured to determine (e.g., measure) the magnitude of the load voltage $V_{LOAD}$ while the average magnitude of the load current $I_{LOAD}$ is within a measurement window that may range from a maximum learning threshold $I_{LEARN-MAX}$ and a minimum learning threshold $I_{LEARN-MIN}$ (e.g., between times $t_{WIN-START}$ and $t_{WIN-END}$ as shown in FIG. 11A). The maximum learning threshold $I_{LEARN-MAX}$ and the minimum learning threshold $I_{LEARN-MIN}$ may be functions of a rated (or maximum) current $I_{RATED}$ of the LED light source 802, for example, $0.0020 \cdot I_{RATED}$ and $0.0002 \cdot I_{RATED}$, respectively. The processor 842 may be configured to periodically sample the load voltage feedback signal during the measurement window, and to process the plurality of samples to determine the learned load voltage $V_{LEARNED}$. For example, the processor 842 may be configured to process the plurality of samples of the load voltage feedback signal by calculating an average or median value of the plurality of samples or filtering the samples using a digital low-pass filter.

The processor 842 may be configured to measure the load voltage $V_{LOAD}$ and determine the learned load voltage $V_{LEARNED}$ when (e.g., each time that) the processor 842 turns the LED light source 802 off (e.g., fades the LED light source off). The processor 842 may be configured to overwrite the learned load voltage $V_{LEARNED}$ stored in the memory with the learned load voltage $V_{LEARNED}$ determined the last time that the processor 842 turned off the LED light source 802. In addition, the processor 842 may be configured to process the learned load voltages $V_{LEARNED}$ from multiple turn-off events (e.g., calculate the average or median value of the multiple learned load voltages) before overwriting the learned load voltage $V_{LEARNED}$ stored in the memory.

Figure 11B:
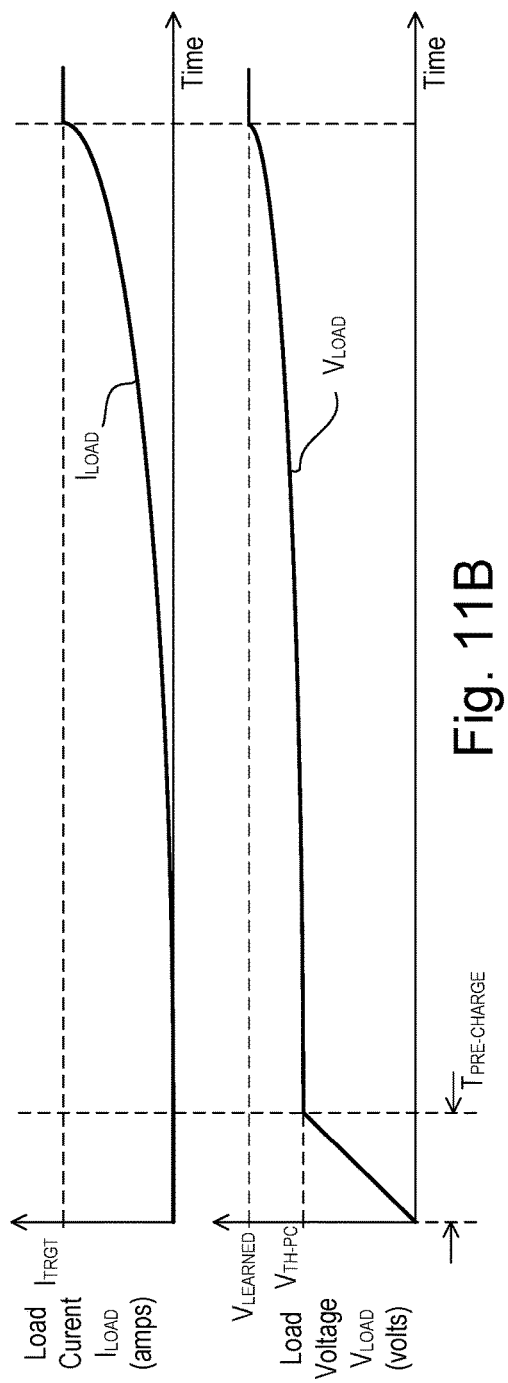
FIG. 11B shows example waveforms illustrating the operation of the LED driver of FIG. 8 when the LED driver is turning on an LED light source using the learned load voltage.

The processor 842 may be configured to control the LED drive circuit 830 using the learned load voltage $V_{LEARNED}$, for example, when turning on the LED light source 802. FIG. 11B shows example waveforms illustrating the operation of the LED driver 800 when the processor 842 is fading on the LED light source 802 (e.g., fading on to a target intensity $L_{TRGT}$ that corresponds to a target current $I_{TRGT}$). In response to receiving a command to turn on the LED light source 802 and/or in response to power being applied to the LED driver 800 to turn on the LED light source, the processor 842 may be configured to pre-charge the output capacitor C836 of the LED drive circuit 830 during a pre-charge period $T_{PRE-CHARGE}$ prior to attempting to turn on the LED light source 802. During the pre-charge period $T_{PRE-CHARGE}$, the processor 842 may be configured to control the duty cycle of the pulse-width modulated signal $V_{PWM}$ (and thus the DC magnitude of the target-current control signal $V_{I-TRGT}$) as a function of the learned load voltage $V_{LEARNED}$ to cause the output capacitor C836 to charge faster than normal (e.g., faster than if the processor 242 controlled the DC magnitude of the target-current control signal $V_{I-TRGT}$ in response to the target current $I_{TRGT}$ as shown in FIG. 9B). The faster rate at which the output capacitor C836 charges during the pre-charge period $T_{PRE-CHARGE}$ may allow the processor 842 to turn-on the LED light source 802 quickly and consistently, e.g., when fading the LED light source on to the low-end intensity $L_{LE}$.

The control circuit 840 may be configured to pre-charge the output capacitor C836 of the LED drive circuit 830 until the magnitude of the load voltage $V_{LOAD}$ reaches or exceeds a pre-charge voltage threshold $V_{TH-PC}$. The pre-charge voltage threshold $V_{TH-PC}$ may be determined, for example, as a function of the learned load voltage $V_{LEARNED}$ (e.g., $V_{TH-PC} = \alpha \cdot V_{LEARNED}$, where $\alpha$ is a constant that may be, for example, approximately 0.90). Since the magnitude of the load voltage $V_{LOAD}$ may be greater when the LED light source 802 is cold than when the LED light source 802 is warm, the constant $\alpha$ may be sized to be less than one to ensure that the LED drive circuit 830 does not overshoot the learned load voltage $V_{LEARNED}$ when pre-charging the output capacitor C836. Additionally or alternatively, the pre-charge voltage threshold $V_{TH-PC}$ may be determined, for example, using a different function of the learned load voltage $V_{LEARNED}$ (e.g., $V_{TH-PC} = V_{LEARNED} - \beta$, where $\beta$ is a constant that may be, for example, approximately one volt). Additionally or alternatively, the pre-charge voltage threshold $V_{TH-PC}$ may be a fixed threshold (e.g., a predetermined threshold). The processor 842 may be configured to cease pre-charging the output capacitor C836 if the magnitude of the load voltage $V_{LOAD}$ does not exceed the pre-charge voltage threshold $V_{TH-PC}$ within a timeout period. The processor 842 may be configured to select the value of the duty cycle of the pulse-width modulated signal $V_{PWM}$ based on the learned load voltage $V_{LEARNED}$ such that pre-charge period $T_{PRE-CHARGE}$ for the LED driver 800 may be approximately the same for different LED light sources that have different resulting load voltages.

The processor 842 may control the start-up control signal $V_{START-UP}$ to render the controllable switching circuit 858 of the integrator circuit 850 conductive during the pre-charge period $T_{PRE-CHARGE}$. After the magnitude of the load voltage $V_{LOAD}$ reaches or exceeds the pre-charge voltage threshold $V_{TH-PC}$, the processor 842 may control the start-up control signal $V_{START-UP}$ to render the controllable switching circuit 858 of the integrator circuit 850 non-conductive. This may allow the integrator circuit 50 and the latch circuit 860 to control the LED drive circuit 830 using closed loop control in response to the current feedback signal $V_{I-FB}$ to regulate the magnitude of the load current $I_{LOAD}$ towards the target current $I_{TRGT}$.

Figure 12:
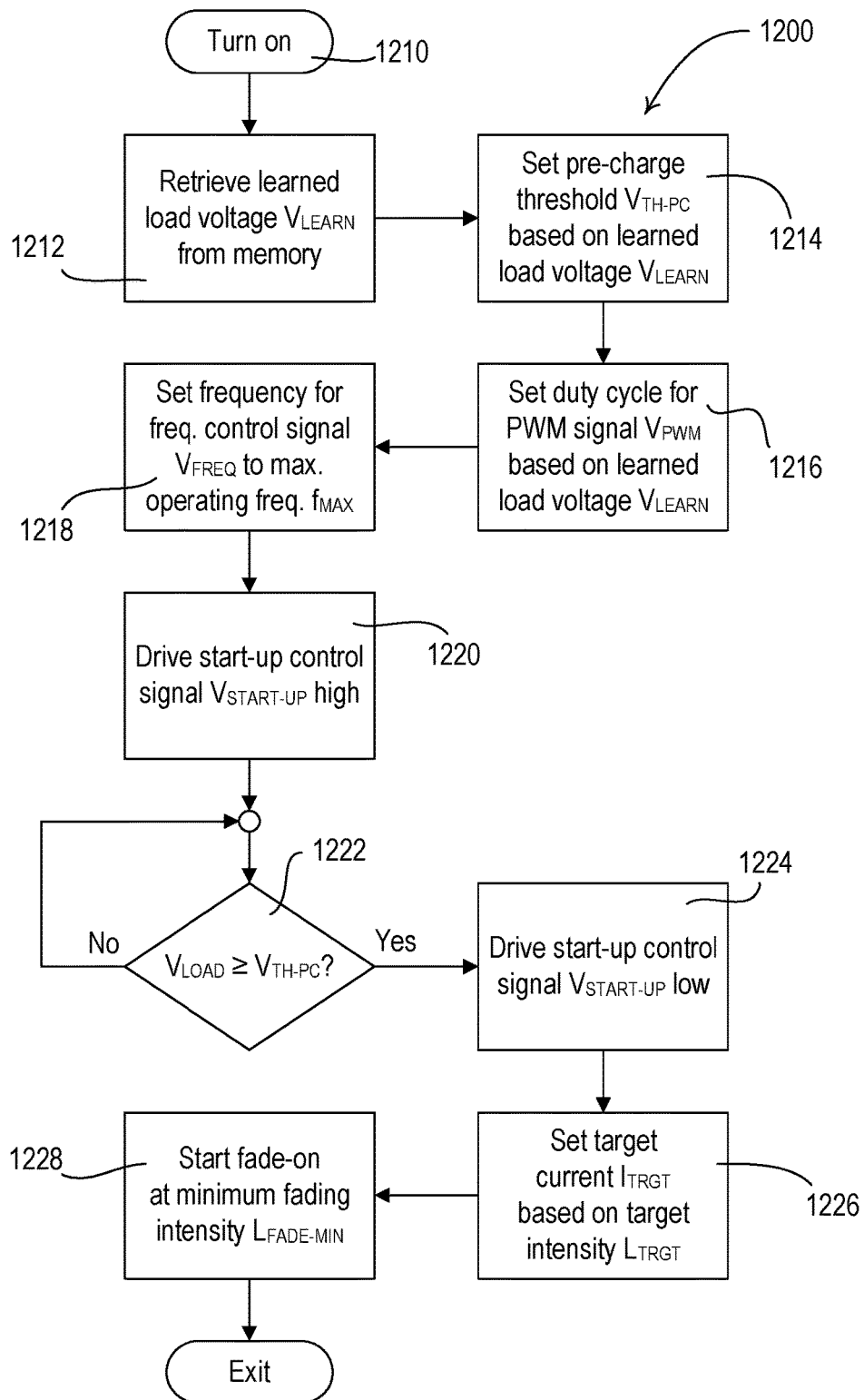
FIG. 12 is a simplified flowchart of another example turn-on procedure for controlling a power converter circuit of an LED driver.

FIG. 12 is a simplified flowchart of an example turn-on procedure 1200 for controlling a power converter circuit of an LED driver (e.g., the LED drive circuit 830 of the LED driver 800). For example, the turn-on procedure 1200 may be executed by a control circuit (e.g., the control circuit 840) at step 1210 in response to receiving a command to turn on a LED light source and/or in response to power being applied to the LED driver to turn on the LED light source. The control circuit may retrieve the learned load voltage $V_{LEARNED}$ from memory at step 1212 and may set the value of the pre-charge threshold $V_{TH-PC}$ based on the learned load voltage $V_{LEARNED}$ at step 1214. At 1216, the control circuit may set the duty cycle of the pulse-width modulated signal $V_{PWM}$ based on the learned load voltage $V_{LEARNED}$. The control circuit may set the frequency of the frequency control signal $V_{FREQ}$ to be equal to the maximum operating frequency $f_{MAX}$ at 1218, and may drive the startup control signal $V_{START-UP}$ high to render the controllable switching circuit 858 conductive at 1220. When the magnitude of the bus voltage $V_{BUS}$ is greater than or equal to the pre-charge threshold $V_{TH-PC}$ at step 1222, the control circuit may drive the startup control signal $V_{START-UP}$ low to render the controllable switching circuit 858 non-conductive at 1224 and set the target current $I_{TRGT}$ based on the target intensity $L_{TRGT}$ at 1226. The control circuit may begin to fade on the LED light source at 1228 by starting at the minimum fading intensity $L_{FADE-MIN}$ and slowly increasing the present intensity $L_{PRES}$ of the LED light source towards the target intensity $L_{TRGT}$, before the turn-on procedure 1200 exits.

What is claimed is:

1. A load control device for controlling the intensity of a lighting load, the load control device comprising:
   a power converter circuit configured to receive a first voltage and to produce a second voltage across a capacitor; and
   a control circuit operatively coupled to the power converter circuit and configured to control the power converter circuit to generate the second voltage across the capacitor;
   wherein the control circuit is configured to determine a learned capacitor voltage from the magnitude of the second voltage of the capacitor, the control circuit configured to determine an operating parameter associated with the power converter circuit as a function of the learned capacitor voltage, the control circuit configured to control the power converter circuit according to the operating parameter to charge the capacitor until the magnitude of the second voltage reaches a threshold.

2. The load control device of claim 1, further comprising:
   a load regulation circuit configured to receive the second voltage and to control the magnitude of a load current conducted through the lighting load;
   wherein the control circuit is operatively coupled to the load regulation circuit and configured to control the magnitude of the load current to control the intensity of the lighting load.

3. The load control device of claim 2, wherein the power converter circuit comprises a semiconductor switch and the control circuit is configured to render the semiconductor switch conductive for an on-time during each operating cycle of the power converter circuit.

4. The load control device of claim 3, wherein the control circuit is configured to determine a pre-load on-time as a function of the learned capacitor voltage, and render the semiconductor switch conductive for the pre-load on-time to charge the capacitor until magnitude of the second voltage reaches the threshold.

5. The load control device of claim 4, wherein the control circuit is configured to determine the pre-load on-time based on a linear relationship between the learned capacitor voltage and the pre-load on-time.

6. The load control device of claim 3, wherein, after the magnitude of the second voltage exceeds the threshold, the control circuit is configured to regulate the magnitude of the second voltage towards a target voltage by adjusting the on-time of the semiconductor switch in response to the magnitude of the second voltage.

7. The load control device of claim 2, wherein the control circuit is configured to determine the magnitude of the second voltage when the intensity of the lighting load is at approximately a high-end intensity.

8. The load control device of claim 2, wherein the second voltage is approximately equal to a load voltage developed across the lighting load.

9. The load control device of claim 1, wherein the power converter circuit is configured to control the magnitude of a load current conducted through the lighting load, and the control circuit is operatively coupled to the power converter circuit for controlling the magnitude of the load current to control the intensity of the lighting load.

10. The load control device of claim 9, wherein the control circuit comprises a digital control circuit configured to generate a target-current control signal and an analog control loop circuit configured to control the power converter circuit to control the magnitude of the load current in response to the target-current control signal.

11. The load control device of claim 10, wherein the digital control circuit is configured to set a magnitude of the target-current control signal based on the learned capacitor voltage to charge the capacitor until the magnitude of the second voltage reaches the threshold.

12. The load control device of claim 11, wherein, after the magnitude of the second voltage exceeds the threshold, the digital control circuit is configured to set the magnitude of the target-current control signal based on a target current for the load current, and the analog control loop circuit is configured to regulate the magnitude of the load current towards the target current.

13. The load control device of claim 9, wherein the control circuit is configured to measure the magnitude of the second voltage when the intensity of the lighting load is at approximately a low-end intensity.

14. The load control device of claim 9, wherein the control circuit is configured to measure the magnitude of the second voltage when the power converter circuit is fading the lighting load from on to off.

15. The load control device of claim 1, wherein the control circuit is configured to measure the magnitude of the second voltage and to store a value representative of the measured voltage as the learned capacitor voltage.

16. The load control device of claim 1, wherein the control circuit is configured to determine the threshold as a function of the learned capacitor voltage.

17. A load control device for controlling the intensity of a lighting load, the load control device comprising:
    a power converter circuit configured to generate a bus voltage across a bus capacitor;
    a load regulation circuit configured to receive the bus voltage and to control the magnitude of a load current conducted through the lighting load; and
    a control circuit operatively coupled to the load regulation circuit and configured to control the magnitude of the load current to adjust the intensity of the lighting load;
    wherein the control circuit is configured to measure a voltage representative of a load voltage produced across the lighting load and to store a value representative of the measured voltage as a learned load voltage, the control circuit configured to determine an operating parameter for the power converter circuit as a function of the learned load voltage, the control circuit configured to control the power converter circuit to charge the bus capacitor using open loop control according to the operating parameter until the magnitude of the bus voltage reaches a threshold.

18. The load control device of claim 17, wherein the control circuit is configured to render a semiconductor switch of the power converter circuit conductive for an on-time during each operating cycle of the power converter circuit, the control circuit further configured to determine a pre-load on-time as a function of the learned load voltage, and render the semiconductor switch conductive for the pre-load on-time to charge the bus capacitor until the magnitude of the bus voltage reaches the threshold.

19. The load control device of claim 18, wherein, after the magnitude of the bus voltage exceeds the threshold, the control circuit is configured to regulate the magnitude of the bus voltage towards a target bus voltage by adjusting the on-time of the semiconductor switch in response to the magnitude of the bus voltage.

20. The load control device of claim 17, wherein control circuit is configured to determine the threshold as a function of the learned load voltage.

21. The load control device of claim 17, wherein the control circuit is configured to measure the bus voltage to determine the learned load voltage.

22. A load control device for controlling the intensity of a lighting load, the load control device comprising:
a load regulation circuit configured to receive a bus voltage and to control the magnitude of a load current conducted through the lighting load, the load regulation circuit comprising an output capacitor configured to store a load voltage developed across the lighting load; and
a control circuit operatively coupled to the load regulation circuit and configured to control the magnitude of the load current to control the intensity of the lighting load;
wherein the control circuit is configured to measure the magnitude of the load voltage and to store a value representative of the measured magnitude of the load voltage as a learned load voltage, the control circuit configured to determine an operating parameter for the load regulation circuit as a function of the learned load voltage, the control circuit configured to control the load regulation circuit according to the operating parameter to charge the output capacitor until the magnitude of the load voltage reaches a threshold.

23. The load control device of claim 22, wherein the control circuit is configured to measure the magnitude of the load voltage when the lighting load is on, and control the load regulation circuit according to the operating parameter when the control circuit is controlling the lighting load from off to on.

24. The load control device of claim 23, wherein the control circuit comprises a digital control circuit configured to generate a target-current control signal and an analog control loop circuit configured to control the load regulation circuit to control the magnitude of the load current in response to the target-current control signal, the digital control circuit further configured to set a magnitude of the target-current control signal based on the learned load voltage to charge the output capacitor until the magnitude of the load voltage reaches the threshold.

25. The load control device of claim 24, wherein, after the magnitude of the load voltage exceeds the threshold, the digital control circuit is configured to set the magnitude of the target-current control signal based on a target current for the load current, and the analog control loop circuit is configured to regulate the magnitude of the load current towards the target current.

26. The load control device of claim 22, wherein the control circuit is configured to determine the threshold as a function of the learned load voltage.

* * * * *